United States Patent
Tiessen et al.

(10) Patent No.: US 11,235,610 B2
(45) Date of Patent: Feb. 1, 2022

(54) WET-TRAPPING METHOD

(71) Applicant: SUN CHEMICAL CORPORATION, Parsippany, NJ (US)

(72) Inventors: John G. Tiessen, Elk Grove Village, IL (US); Kai-Uwe Gaudl, Freigericht (DE)

(73) Assignee: Sun Chemical Corporation, Parsippany, NJ (US)

( * ) Notice: Subject to any disclaimer, the term of this patent is extended or adjusted under 35 U.S.C. 154(b) by 180 days.

(21) Appl. No.: 16/489,929

(22) PCT Filed: Mar. 6, 2018

(86) PCT No.: PCT/US2018/021010
§ 371 (c)(1),
(2) Date: Aug. 29, 2019

(87) PCT Pub. No.: WO2018/165068
PCT Pub. Date: Sep. 13, 2018

(65) Prior Publication Data
US 2019/0389236 A1 Dec. 26, 2019

Related U.S. Application Data

(60) Provisional application No. 62/467,859, filed on Mar. 7, 2017, provisional application No. 62/512,791, filed on May 31, 2017, provisional application No. 62/541,838, filed on Aug. 7, 2017.

(51) Int. Cl.
| | |
|---|---|
| *B32B 7/00* | (2019.01) |
| *B29C 65/00* | (2006.01) |
| *C08F 2/46* | (2006.01) |
| *C08F 2/50* | (2006.01) |
| *C08G 61/04* | (2006.01) |
| *B41M 5/50* | (2006.01) |
| *B41J 11/00* | (2006.01) |
| *C09D 11/101* | (2014.01) |
| *C09D 11/107* | (2014.01) |
| *C09D 11/108* | (2014.01) |
| *C09D 11/54* | (2014.01) |

(52) U.S. Cl.
CPC .............. *B41M 5/50* (2013.01); *B41J 11/002* (2013.01); *C09D 11/101* (2013.01); *C09D 11/107* (2013.01); *C09D 11/108* (2013.01); *C09D 11/54* (2013.01)

(58) Field of Classification Search
CPC ..... C08F 2/50; C08F 2/46; B32B 7/00; B32B 37/00; B31B 1/60; C08G 61/04; B29C 65/00
USPC ....... 156/310, 60, 1; 522/6, 71, 189, 184, 1; 520/1
See application file for complete search history.

(56) References Cited

U.S. PATENT DOCUMENTS

| | | | |
|---|---|---|---|
| 4,105,806 A * | 8/1978 | Watt ..................... | C09D 11/101 427/407.2 |
| 4,113,895 A | 9/1978 | Watt et al. | |
| 5,945,489 A | 8/1999 | Moy et al. | |
| 6,025,410 A | 2/2000 | Moy et al. | |
| 6,245,827 B1 | 6/2001 | Gregory | |
| 7,214,725 B2 | 5/2007 | Narayan-Sarathy et al. | |
| 9,365,064 B2 | 6/2016 | Tiessen et al. | |
| 2003/0138617 A1 | 7/2003 | Courtoy | |
| 2003/0154871 A1* | 8/2003 | Laksin ................. | C09D 11/101 101/211 |
| 2007/0263060 A1 | 11/2007 | Laskin et al. | |
| 2011/0195256 A1 | 8/2011 | Morikawa et al. | |
| 2011/0274891 A1 | 11/2011 | De Rossi | |
| 2012/0304879 A1 | 12/2012 | Tiessen et al. | |

FOREIGN PATENT DOCUMENTS

| | | |
|---|---|---|
| CN | 101914175 A | 12/2010 |
| CN | 105017487 A | 11/2015 |
| EP | 1333073 A1 | 8/2003 |
| WO | WO 2014/165323 A1 | 10/2014 |

OTHER PUBLICATIONS

International Search Report issued in International Application No. PCT/US2018/021010, dated Apr. 26, 2018.
Written Opinion of the International Searching Authority issued in International Application No. PCT/US2018/021010, dated Apr. 26, 2018.
International Preliminary Report on Patentability issued in International Application No. PCT/US2018/021010, dated Apr. 8, 2019.
Xinhua Liu, Bin He, Haifeng Tang & Qigang Wang. Tough nanocomposite ionogel-based actuator exhibits robust performance. Scientific Reports, 4:6673 (2014).
("Advances In light-induced polymerizations: I. Shadow cure in free radical photopolymerizations, II. Experimental and modeling studies of photoinitiator systems for effective polymerizations with LEDs." Copyright 2012 Hajime Kitano. University of Iowa.
Extended European Search Report issued in counterpart EP Application No. 1876468.2, dated Dec. 15, 2020.
Xinhua Liu, Dongbei Wu, Huanlei Wang and Qigang Wang. Self-recovering tough gel electrolyte with adjustable supercapacitor performance. Advanced Materials, 26(25):4370-4375 (2014).

(Continued)

*Primary Examiner* — Jessica Whiteley
(74) *Attorney, Agent, or Firm* — Marian E. Fundytus; Ostrolenk Faber LLP.

(57) ABSTRACT

The present invention provides a method for applying multiple ink and/or coating layers on a substrate. At least one of the ink and/or coating layers contains one or more photoinitiators, and at least one of the ink and/or coating layers does not contain any photoinitiators. In certain embodiments, all of the ink and/or coating layers are wet trapped and the entire print construct is cured by exposure to UV radiation after all of the ink and/or coating layers have been applied. In certain embodiments, the wet trapping method of the present invention can be used to prepare laminates.

19 Claims, No Drawings

(56) References Cited

OTHER PUBLICATIONS

Li Dan, Guo Wenxun, Gao Peng and Wen Annan ("A Novel Self-initiated Waterborne UV Curable System," Petrochemical Technology, vol. 42, Issue 4, pp. 435-440 Journal 2013).
Yuan Hua, Guo Wenxun, and Gao Peng discuss self-initiated UV curing polymers ("Synthesis of a Self-Initiated UV-curing Polymer," Applied Chemical Industry, vol. 40, Issue 7, pp. 1180-1182, 1204; Journal 2011).
GI. Ozturk, M. Zhang, and T.E. Long ("Self-Initiating UV-Curable Polyester Networks," Polymer Preprints (American Chemical Society, Division of Polymer Chemistry), vol. 50, Issue 2, pp. 627-628. Journal 2009).
DeSousa and Khudyakov describe UV-curable amideimide oligomers ("Ultraviolet UV-Curable Amideimide Oligomers," Industrial & Engineering Chemistry Research, vol. 45, Issue 19, pp. 6413-6419, Journal 2006).
G. Douglass Dixon and Nancy W. Carlson describe deep cure of a polymer using surface radiation ("Deep Section Polymerization Initiated by Surface Radiation Irradiation , Part 1 Monomers," RadTech Report, vol. 13, Issue 2, pp. 28-32, Journal 1999).
G. Douglass Dixon and Nancy W. Carlson describe deep cure of a polymer using surface radiation ("Deep Section Polymerization Initiated by Surface Radiation Irradiation , Part 2 Initiators," RadTech Report, vol. 13, Issue 2, pp. 36-39, Journal 1999).
Columbian Examination Report issued in counterpart CO Application No. NC2019/0009672, dated Jun. 30, 2021.
Chinese Examination Report issued in counterpart CN Application No. 201880016254.9 dated Aug. 26, 2021.
Colombian Examination Report issued in counterpart CO Application No. NC2019/0009672 dated Nov. 30, 2021 with English language machine translation thereof.

\* cited by examiner

WET-TRAPPING METHOD

CROSS REFERENCE TO RELATED APPLICATIONS

The present application is a § 371 National Phase application based on PCT/US2018/021010 filed Mar. 6, 2018, which claims the benefit of U.S. Provisional Application Nos. 62/467,859, filed Mar. 7, 2017, 62/512,791, filed May 31, 2017, and 62/541,838, filed Aug. 7, 2017, the subject matter of each of which is incorporated by reference in their entirety.

FIELD OF THE INVENTION

The present invention is related to the printing of multiple layers of inks and/or coatings on a substrate. The present invention is particularly related to a wet trapping method of printing or applying multiple layers of inks and/or coatings on a substrate. The present invention is also related to preparing laminated articles using the wet trapping method of the present invention.

BACKGROUND OF THE INVENTION

It is often necessary to print substrates with multiple layers of inks and/or coatings. When using energy-curable inks and/or coatings, typically each layer is cured before the next layer is overprinted.

Many energy curable inks and/or coatings must contain photoinitiators to enable adequate cure. However, there are disadvantages of using photoinitiators. For example, photoinitiator residue left after cure may compromise the solvent resistance of the cured ink or coating by acting as a plasticizer. In addition, in packaging articles, such as for pharmaceuticals or cosmetics, unreacted photoinitiator and photoinitiator fragments may migrate through the printed substrate, and contaminate the product contained therein. Photoinitiators are also expensive.

In an effort to reduce the amount of photoinitiators used in printing energy curable inks and/or coatings, several groups have attempted to make "self-initiating" energy curable polymers to be used as the binder in the inks or coatings. To date, although there have been some interesting developments, none of the proposed solutions is adequate to achieve the necessary resistance properties, etc. after cure required of articles prepared with multiple layers of inks and/or coatings.

CN 105017487 discloses a siloxane polyurethane prepared from polyester diol with a silane coupling agent and a tin catalyst that will generate free radicals and trigger double bond polymerization under UV radiation. It is not clear how the system generates free radicals, and the mechanism may actually be thermal.

It has been shown that a crosslinked system can be built when electrolytes 2-hydroxyethyl methacrylate (HEMA), 1-butyl-3-methylimidazolium tetrafluoroborate (BMIMBF) and $TiO_2$ particles are activated by UV light (Xinhua Liu, Bin He, Haifeng Tang & Qigang Wang. Tough nanocomposite ionogel-based actuator exhibits robust performance. Scientific Reports, 4:6673 (2014)). HEMA is an acrylate, BMIMBF is an ionic liquid, and $TiO_2$ is evidently the source of the free radicals. Therefore, technically, $TiO_2$, as the source of free radicals, functions as the photoinitiator.

It has been taught that 1-ethyl-3-methyl-imidazolium chloride ([EMIM]Cl), hydroxyethyl methacrylate (HEMA), chitosan, and water can be dissolved in each other and cross-linked under UV light (Xinhua Liu, Dongbei Wu, Huanlei Wang and Qigang Wang. Self-recovering tough gel electrolyte with adjustable supercapacitor performance. Advanced Materials, 26(25):4370-4375 (2014)). It is purported that UV radicals are formed as UV light splits [EMIM]Cl to form chloride anions. Thus, [EMIM]Cl functions as the photoinitiator.

Another example of a purportedly self-initiated system is described Li Dan, Guo Wenxun, Gao Peng and Wen Annan ("A Novel Self-initiated Waterborne UV Curable System," Petrochemical Technology, Volume 42, Issue 4, Pages 435-440 Journal 2013). A tin chloride catalyzed polymer of tribromoaniline and tribromophenyl maleimide shows UV curing properties. Photoinitiator is unknown and does not appear to be present, but there is also no indication that the material does anything other than cure itself when exposed to UV.

A self-initiated and UV-curing amphiphilic macromolecular resin is described in CN 101914175. Hydroxy or amino containing coumarins are reacted with isocyanates with dibutyl tin dilaurate as the catalyst at a 1:1 molar ratio. The product is then acrylated using various monomers in specific ratios with azobisisobutyronitrile used as the initiator. The resulting polymer will cure upon exposure to UV light. Coumarins that were used include 4-Hydroxy, 3-Amino, 3-Phenyl-7-Amino, 7-Methyl-4-Hydroxy, 4-Ethoxy-7-Hydroxy, 6,8-Dichloro-7-Hydroxy, and 6-Amino-3,4-Benzo.

Yuan Hua, Guo Wenxun, and Gao Peng discuss self-initiated UV curing polymers ("Synthesis of a Self-Initiated UV-curing Polymer," Applied Chemical Industry, Volume 40, Issue 7, Pages 1180-1182, 1204; Journal 2011). An unsaturated polyester-urea copolymer was produced that will cure to a good hardness upon 30-60 seconds of exposure to UV. The components include propylene glycol, urea, phthalic anhydride, maleic anhydride and sebacic acid. Interestingly, the optimal curing performance occurs at an acid value of 50 and urea content of 4%-5%.

Other examples of self-initiated UV-curable polyester networks are discussed by GI. Ozturk, M. Zhang, and T. E. Long ("Self-Initiating UV-Curable Polyester Networks," Polymer Preprints (American Chemical Society, Division of Polymer Chemistry), Volume 50, Issue 2, Pages 627-628. Journal 2009). Mechanism of photolysis followed by Michael Addition of the fragments to form an interpenetrated gel network was examined. (This was also presented as a paper at the 2009 ACS National Meeting in Washington, D.C.)

DeSousa and Khudyakov describe UV-curable amideimide oligomers ("Ultraviolet UV-Curable Amideimide Oligomers," Industrial & Engineering Chemistry Research, Volume 45, Issue 19, Pages 6413-6419, Journal 2006). The abstract is enclosed in full: Two blends of UV-curable oligomers, based on a reaction of cyclic dianhydrides with w-hydroxy-substituted acrylate and with isophorone diisocyaate (IPDI) were prepared. The cyclic dianhydrides used were benzene-1,2,4,5-tetracarboxylic acid dianhydride (PMDA) and benzophenone-3,3',4,4'-tetracarboxylic dianhydride (BTDA). The two oligomers were poly(imideamide). The oligomer based on BTDA was reported as being self-initiating (i.e. does not require an addition of any photoinitiator to be cured by UV light). This property is apparently to the presence of a benzophenone fragment in the structure of BTDA. The oligomer prepared with BTDA may also serve as an initiator for other free-radical UV-light-induced curing of acrylate and/or methacrylate oligomers. However, in order to utilize the self-initiating material in order to cure other materials that are not, in and of themselves, sensitive to UV light, the material must be intimately mixed with them in the same layer of material.

G. Douglass Dixon and Nancy W. Carlson describe deep cure of a polymer using surface radiation ("Deep Section Polymerization Initiated by Surface Irradiation, Part 1 Monomers," *RadTech Report*, Volume 13, Issue 2, Pages 28-32, Journal 1999). Using peroxide (thermal) initiators with amine accelerators in an acrylic system containing typical photoinitiators, produces enough of a thermal effect after brief exposure to surface UV irradiation that complete cure can occur even in areas that are not in the line-of-sight of the UV light. The secondary cure is stated as being non-directional. This is not predictive of the current invention because a single layer of coating is used and, as in previous examples, there is no layer without photoinitiator in it.

U.S. Pat. No. 6,245,827 discloses a liquid resin product having good through cure. This was accomplished by utilizing cycloaliphatic epoxides, caprolactones, a cationic photoinitiator and then an "accelerator" consisting of a standard free-radical type alpha-hydroxy-ketone photoinitiator (specifically Darocur 1173 or Irgacure 184) and typical organic peroxide thermal free-radical generators (Lupersol). It is claimed that the alpha-hydroxy-ketone reduces the salt fragment of the disintegrated cationic photoinitiator to generate the heat of reaction required to decompose the organic peroxide. This is a conventional dual cure mechanism.

The quest for self-initiated UV-curing polymers has also been an academic endeavor ("Advances In light-induced polymerizations: I. Shadow cure in free radical photopolymerizations, II. Experimental and modeling studies of photoinitiator systems for effective polymerizations with LEDs." Copyright 2012 Hajime Kitano. University of Iowa. This dissertation is available at Iowa Research Online: http://ir.uiowa.edu/etd/4866).

U.S. Pat. No. 7,214,725 describes a series of acrylate materials that can also participate in Michael additions. While this patent is often cited, it should be noted that it specifically does not claim to work without the use of photoinitiator in UV exposure situations, but rather at significantly lower photoinitiator levels.

The resin technology for U.S. Pat. No. 7,214,725 is based on synthesis U.S. Pat. Nos. 5,945,489 and 6,025,410 (same authors and priority date). These patents purportedly disclose liquid oligomers containing unsaturation which can be crosslinked using ultraviolet light without adding costly photoinitiators. However, the curing for the proof of concept was achieved using 1.0% of Irgacure 500 in both cases (CAS 118690-08-07, itself a mixture of 1-benzoylcyclohexanol aka Irgacure 184 CAS 947-19-3 and Benzophenone CAS 119-61-9). Irgacure 500 is most certainly a photoinitiator. The technology is neither truly self-initiating nor is it in any way photoinitiator free.

Thus, there remains a need for a more efficient, cost-effective method of printing multiple layers of inks and/or coatings on a substrate.

SUMMARY OF THE INVENTION

The present invention provides a method for printing multiple layers of inks and/or coatings on a substrate. Disclosed is a wet-trapping method using primarily energy curable inks and coatings. The method is suitable for paste ink/coating methods (e.g. offset) as well as liquid ink/coating methods (e.g. flexography). The present invention also provides a method of printing a porous substrate wherein the porous is sealed with a cured primer coating layer prior to performing the wet-trapping method of the present invention.

In one aspect, the present invention provides a wet-trapping method of preparing a printed article, comprising:
  a) providing a substrate;
  b) applying to the substrate one or more energy-curable ink or coating layers (A) containing one or more photoinitiators;
  c) applying to the substrate one or more energy-curable ink or coating layers (B) containing no photoinitiators; and
  d) curing all coating and/or ink layers simultaneously at the end of the print run;
wherein one or more of the energy-curable ink or coating layers may be a primer coating; and
wherein one or more of the energy-curable ink or coating layers may be a topcoat;
provided that at least one of the ink or coating layers contains one or more photoinitiators.

In another aspect, the present invention provides a method of printing a porous substrate, comprising:
  a) providing a porous substrate;
  b) applying an energy curable coating (C);
  c) curing the energy curable coating (C);
  d) applying one or more energy curable ink or coating layers (A) and/or (B) on top of the cured coating (C);
    i) wherein one or more of the energy curable ink or coating layers are an energy curable ink or coating layer (B) containing no photoinitiator;
  e) applying a UV curable coating layer (A), which is a topcoat containing one or more photoinitiators; and
  f) curing the topcoat and underlying ink or coating layers simultaneously.

In another aspect, the present invention provides a wet-trapping method of preparing a laminated article, comprising:
  a) providing a first substrate and a second substrate, wherein at least one of the first or second substrate is transparent to UV radiation;
  b) applying one or more energy-curable ink or coating layers (A) containing one or more photoinitiators to at least one of the first substrate or the second substrate;
  c) applying one or more energy-curable ink or coating layers (B) containing no photoinitiators to at least one of the first substrate or the second substrate;
  d) laminating the first and second substrates wet face to wet face, or dry face to wet face; and
  e) curing the energy-curable ink or coating layers simultaneously through the substrate that is transparent to UV radiation.

In certain embodiments, the present invention provides a substrate comprising multiple layers of inks and/or coatings printed according to the methods of the present invention.

In other embodiments, the present invention provides articles comprising the substrates prepared by the methods of the present invention.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention provides an improved method for printing substrates and articles with multiple layers of inks and/or coatings. A wet-trapping method of printing is disclosed. The method of the present invention is particularly suitable for energy curable inks and/or coatings. The present invention also provides a method for preparing lamination substrates by wet trapping ink and/or coating layers on the face of each substrate in contact with the other substrate.

The method is equally applicable to paste ink/coating methods (e.g. offset) as it is to liquid ink/coating methods (e.g. flexography). In the paste ink, wet trapping can be accomplished by measuring and controlling "tack." This methodology is described by ASTM Standard D4361 ("Standard Test Method for Apparent Tack of Printing Inks and Vehicles by a Three-Roller Tackmeter") and other similar documents known to those of ordinary skill in the art. In the case of liquid, specifically flexographic inks/coatings, wet trapping can be accomplished by measuring and controlling rheological properties of the inks/coatings. These methods of measuring and controlling rheological properties of the inks/coatings are described in U.S. Pat. No. 9,365,064, the disclosure of which is hereby incorporated herein in its entirety. The application or printing method is not limited, and can include, for example, lithographic printing, flexographic printing, ink jet printing, screen printing, intaglio printing, etc.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein "article" or "articles" means a substrate or product of manufacture. Examples of articles include, but are not limited to: substrates such as paper, fabric, leather, textiles, felt, concrete, masonry, stone, plastic, plastic or polymer film, glass, ceramic, metal, wood, composites, and the like; and products of manufacture such as publications (e.g. brochures), labels, and packaging materials (e.g. cardboard sheet or corrugated board), containers (e.g. bottles, cans), clothing, a polyolefin (e.g. polyethylene or polypropylene), a polyester (e.g. polyethylene terephthalate), a metalized foil (e.g. laminated aluminum foil), metalized polyester, a metal container, and the like.

As used herein, the terms "inks and/or coatings," "inks and coatings," "inks or coatings," "inks," and "coatings" are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention. Compositions of the current invention are especially suited for use in compositions curable under the action of UV light and/or electron-beam.

As used herein, "coated paper" or "coated paper substrate" means a paper that has been finished with a clay coat or similar smooth surface for printing by the paper manufacturer.

As used herein, "uncoated paper" or "uncoated paper substrate" means a paper that has been left open by the paper manufacturer so that printing occurs directly on the paper fibers.

As used herein, "grafted recycled polystyrene" or "rPS" refers to polystyrene resin that has been depolymerized, and then copolymerized with (meth)acrylate, and/or styrene and/or (meth)acrylic acid monomers and/or oligomers.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

Wet-Trapping Method

The method of the present invention provides several advantages to the conventionally used methods for printing multiple ink and/or coating layers on substrates and articles.

Coatings containing unsaturated bonds that can be cured into polymers by means of free radical addition are known. Various sources of free radicals have been used, including thermal generation (e.g. organic peroxides) and photo generation (e.g. photoinitiators).

Radiation curable compositions containing acrylic acid ester groups (acrylates) can be cured by exposure to ultraviolet light (UV) or electron beam (EB). For a fast curing UV curing system, a photoinitiator is, as a rule, necessary, which forms radicals under irradiation with photons and initiates free-radical polymerization of the acrylate groups. This then leads to a drying, hardening, and curing of the product. Monomers, oligomers and polymers containing acrylate groups, or other ethylenically unsaturated functional groups such as vinyl groups, as well as photoinitiators, are typically considered, by one of ordinary skill in the art prior to the present invention, essential constituents of radiation-hardening systems that are used as coatings, printing inks, adhesives, or molding compositions.

However, UV- and LED-curable inks containing high levels of photoinitiators are problematic for several applications in packaging, especially food packaging. For example, high levels of unreacted photoinitiators as well as cleavage products from decayed photoinitiators can remain in printed matter and may cause problems, such as, for example, migration and odor.

Therefore, there is a need for printed matters which are fully cured and contain only a small amount, or are free of, classic, low molecular weight photoinitiators, which have high potential for migration, odor, and health risks.

In order to lower the photoinitiator content in the ink and still get a good cure, oxygen the enemy of radical polymerization, must be reduced or excluded in order to avoid oxygen inhibition. Oxygen inhibition means that the oxygen as a bi-radical can easily react with the formed radicals of a photoinitiator, or radicals on the monomer or growing polymer chain, and render them inactive, usually as a peroxide derivative. This can lead to insufficient drying in the ink, when oxygen is present.

In order to minimize oxygen inhibition, several measures have been proposed. For example, inerting a UV dryer with nitrogen or carbon dioxide can be done. This requires a sophisticated press-side installation to reduce the oxygen content at the point of cure, and is especially difficult to install for sheet-fed presses.

It has always been assumed that, in order for a photo-cured (e.g. a free radical cured acrylate or methacrylate) to be cured, that it was necessary to have some combination of the following:

A source of ionizing radiation such as an electron beam (EB) that bombards the coating while it is under a blanket of nitrogen or other inerting gas in order to prevent oxygen inhibition of the free radical curing mechanism; or A UV light source with a photoinitiator contained as a component in the coating. In the absence of an inerting gas blanket, a sufficient quantity of photoinitiator and intensity of UV light is required in order to react away the oxygen present and allow the cure to proceed to completion before diffusion of atmospheric oxygen back into the system poisons and ends further free radical addition reactions.

In the former case (EB), the inks and coatings required for a job are typically wet-trapped with cure occurring in the EB unit at the end of the press. In the latter case (UV), each ink or coating is generally individually cured before the web or sheet proceeds to the next printing station.

It has never been considered that free radical layers that do not contain photoinitiator can be wet-trapped between a photoinitiator containing primer layer and a photoinitiator containing topcoat layer, and that the entire sandwich can be cured at once with a single exposure to UV light. Specifically, it was not previously known that it was not necessary for each individual layer in the structure to contain photoinitiator. It was further not known that free radicals generated in an adjacent layer (for example, the primer below or the topcoat above) can migrate into the uncured intermediate layers, and cure these to an equal or even greater level than is possible with individual exposure of each photoinitiated layer to an individual UV lamp. The present invention is the first time that is has been shown that multiple layers of inks and/or coatings can be printed by wet-trapping the layers of ink and/or coating, and curing all of the layers simultaneously at the end of the print run, provided that at least one of the ink and/or coating layers contains a photoinitiator.

The advantages of this discovery are numerous. For example, there can be a reduction in the number of UV lamps required for a multi-color coated print job from one per coating/printing station (often equal to or even greater than eight) to a single unit after the last printing station (often a topcoat).

Another advantage is that there is an elimination of photoinitiator in intermediate layers in a printing construction. This can save on cost because often the photoinitiators are the most expensive component of the formula.

The method of the present invention allows for a reduction in total photoinitiator load in a composite printed structure. Migration of unreacted photoinitiator and photoinitiator reaction fragments are a significant area of concern in regulated packaging applications (e.g. food packaging). Any reduction in these quantities is advantageous.

In certain embodiments, there is an improved cure of the intermediate layers due to the absence of photoinitiator residue after cure. Solvent resistance of the cured product has proven superior for the constructions of the present invention versus those wherein each layer is cured individually before application of the next layer. This is because photoinitiator residue typically does not cure into the backbone of the addition cured polymer. Instead, it functions as a plasticizer and softens the cured layers. The absence of this residue markedly improves the overall ability of the cured layers to resist solvent attack.

Another potential advantage is that, because a primer is typically present, a "universal" ink system can be used without taking into account the specific adhesion properties of the ink binder to the substrate. As long as the primer sticks to the substrate, the ink sticks to the primer, and the topcoat sticks to the ink, the overall construction will be commercially acceptable.

In addition, the method of the present invention may provide greater flexibility in formulating inks and/or coatings. The removal of the 7% to 10% of a formula typically taken up by the photoinitiator opens up a lot of formulating latitude in inks and/or coatings. For example, inks may be formulated with higher pigment loads. Most printers prefer more densely colored inks as they print thinner with better reproduction results. Or, the ability to put resin/oligomer into the ink can be used to improve physical properties, such as solvent resistance and adhesion.

The method of the present invention may also provide improved cure of "difficult to cure colors." White and black inks and coatings are notoriously difficult to cure in UV systems, but much easier to cure in EB systems. Because EB easily penetrates ink layers independently of color, this therefore means that the problem is not the ink chemistry itself, but rather the inability of UV light to fully penetrate the ink layer. Both white and black ink pigments absorb substantial amounts of UV light. Formulators typically counteract this and attempt to get good cure at the bottom of the UV light path (substrate/ink interface) by using higher amounts of photoinitiators in these formulas. However, the largest contributor to UV absorption as the light attempts to pass through the ink layer then becomes the photoinitiator itself. By removing the photoinitiator from the ink layer, a much higher proportion of the UV light will pass all the way through and will react with the photoinitiator in the primer below. Cure can thus progress from the "bottom up," eliminating situations where "top cure" is adequate, but "ink to substrate bond" is poor. In the specific case of UV-LED lamp systems, this method enables good cure in dense yellow colors that is currently impossible to achieve.

The method of the present invention may also provide improved solvent resistance of the ink and/or coating layers. Although the mechanism is not fully known, when inks are "cured all at once" (e.g. sandwiched between photoinitiator containing primer and photoinitiator containing topcoat), the methyl ethyl ketone (MEK) solvent rub resistance improves by orders of magnitude. Whereas typical photoinitiator containing UV inks yield very low MEK rub resistance (e.g. 1 to 5 double rubs), the primer/ink(s)/topcoat systems of the present invention have yielded good MEK rub results of greater than or equal to 100 double rubs. Generally, a commercially acceptable level of MEK rubs is greater than 20, or greater than 100, or greater than 500. EB cured inks with topcoats have long been known for having no better (and often worse) MEK rub resistance properties than UV inks.

Another feature of the present invention is that this may be first time that "lamination replacement" actually becomes a practical proposition. Prior to this, the end resistance of both UV and EB inks for flexible packaging (scuff, rub, oil/solvent resistance) just has never been up to the level of an over-laminate film.

In one embodiment, a primer layer of an energy curable (EC) material containing photoinitiator is deposited on the substrate, typically (but not necessarily) with 100% coverage, but not cured. One or more subsequent layers of ink made with EC curable materials that do not contain photoinitiator are trapped over the primer in the desired print order and pattern. Inks and coating formulated for cure by electron beam (EB) radiation are typically very similar to UV curing inks and coatings, with the exception that EB inks and coatings are formulated with energy curing materials but without photoinitiators. Thus, in certain embodiments, EB inks and coatings may be ideal candidates for the photoinitiator-free layers of the method of the present invention. Last, a topcoat layer of an EC curable material containing photoinitiators is applied in 100% coverage over all of the other layers. The coated substrate is passed under a UV lamp and irradiated at the desired level. Cure is observed to occur from the top to the bottom of the composite structure and can be verified by means of such tests as thumb-twist and solvent rubs. Neither surface marring, nor inter-layer bond failures, nor break-away of the composite from the substrate is observed when the proper levels of photoinitiators and UV irradiation are utilized.

In certain embodiments, one or more inks without photoinitiators are printed on the substrate (i.e. no primer and the first down layer is an ink without a photoinitiator), and a topcoat layer with photoinitiator is printed on top of the inks. The construct is cured by UV radiation at the end of the print run.

In some embodiments, a primer without a photoinitiator is applied on the substrate, followed by one or more layers of inks with photoinitiators. The construct is cured by UV radiation at the end of the print run.

In other embodiments, one or more inks with photoinitiators are printed on the substrate (i.e. no primer and the first down layer is an ink with a photoinitiator), and a topcoat layer without photoinitiator is printed on top of the inks. The construct is cured by UV radiation at the end of the print run.

In certain embodiments, a primer without photoinitiator is printed on the substrate, then one or more ink layers with photoinitiator are printed on top, and the last down layer is a topcoat without photoinitiator. The construct is cured by UV radiation at the end of the print run.

In some embodiments, using a flexible plastic film as the substrate can reduce oxygen inhibition because the flexible plastic film serves as an oxygen barrier. However, although printing on flexible plastic film substrates is suitable for flexographic printing, it is not suitable for a sheet-fed press. Thus, a good solution is missing for sheet-fed presses, dealing mainly with porous paper and board for packaging materials and publication.

In addition, it has now been surprisingly observed that radiation curable inks cured between a paper substrate having a surface sealed with a cured UV- or EB-coating, and a UV-curable topcoat (UV overprint varnish) require less photoinitiator than usual, or even no photoinitiator, to be cured.

In order to seal the surface of a porous substrate from oxygen, first a UV or EB curable coating is applied on a porous paper or board substrate, and is cured by UV- or EB-radiation. The UV/EB coating can be applied as a "primer" which can be, for example, a flexographic coating or a lithographic coating, or a gel coat, or another suitable type of coating having a higher viscosity.

The curing of the first coat can be done in-line. For example, the UV coating is applied first down and dried at an interstation UV dryer before the inks are applied. Alternatively, the porous substrate can be coated with an EB coating offline and cured offline with an EB dryer. The coating weight of the primer is preferably greater than 1 $g/m^2$, and more preferably 2 to 6 $g/m^2$. Usually, the higher the coating weight, the better the sealing of the porous substrate.

The porous substrate may be print stock of paper or board typically used for publications or may be a packaging material in the form of a sheet, a roll which is cut into sheets before printing on the press, a container such as a bottle or beaker or the like, having a weight of 20 to 400 $g/m^2$. It can be uncoated or coated by the typical ways with clay or calcium carbonate, or the like. A coated or denser paper or board is preferred.

In some cases, a person skilled in the art may adjust the properties of the substrate and primer coating, e.g. surface tensions and coating weight, so that the primer coating stays on top of the porous substrate and forms after curing an effective sealing layer. It should be avoided that the coating is sucked up by the porous substrate so that no sealing layer can be formed.

After the radiation curable coating (primer) is cured on top of the porous substrate, radiation curable inks are applied by flexography, lithography, inkjet, screen printing, intaglio printing, or other means. The preferred application is by lithography. The inks are applied with print densities suitable for the application process. The photoinitiator content of the inks is 0 to 20 wt %, preferably 0 to 5 wt %, and most preferably 0 wt %. The inks can be any radiation curable ink, such as typical lithographic UV-inks from existing commercial products, e.g. Sun Chemical's Suncure FLM, USL, ULR, having a reduced content of photoinitiator, or electron beam curable inks, completely without photoinitiator, such as, for example, Sun Chemical's Sunbeam ELM inks.

Finally, the wet, uncured radiation curable inks are over-coated with a UV- or LED-flexographic coating, or a UV- or LED-lithographic coating. The photoinitiator content of top-coating (over-print varnish) is 0 to 20 wt %, preferably 1 to 10 wt %. The coating weight of the top-coating is preferably greater than 1 $g/m^2$, more preferably 2 to 6 $g/m^2$, or for high gloss applications, 6 to 8 $g/m^2$. The inks and coatings are preferably end-cured all together through the applied UV- or LED top coating.

The number of radiation curable ink layers which can be applied on top of the cured primer and underneath the topcoat, mainly depends on the amount of photoinitiator in the topcoat, and on pigmentation of the inks. The more photoinitiator in the topcoat, the better the cure will be in the radiation curable ink layers. Usually, dense black inks will need some amount of photoinitiators, whereas other radiation curable inks can be cured completely without photoinitiator.

It is advantageous that at the instant of UV- or LED-cure, the radiation curable inks are protected from oxygen from the bottom by the sealed coating, and from the top by the UV topcoat, so that the curing conditions are similar to a UV-laminate, which requires less photoinitiator to be cured, usually only $\frac{1}{5}^{th}$ to $\frac{1}{8}^{th}$ of the typical initial photoinitiator concentration. The small amounts of initiating species required for cure of the radiation curable inks are provided by the topcoat by diffusion or added on purpose.

It is advantageous that the UV topcoat does not necessarily need to contain photoinitiators suitable for curing pigmented inks, which are often more sophisticated and costly (e.g. Irgacure 369), than photoinitiators for unpigmented coatings, such as, for example, benzophenone. Moreover, as the coating is not pigmented, the radiation can more easily address the photoinitiators and generate radicals at a high level. Once a radical is formed in the coating and transferred into the adjacent ink layers by diffusion, such a radical, even produced by a coating initiator, can effectively initiate radical polymerization also in the ink.

The UV curable inks and coatings of the present invention can be UV cured by any actinic light, such as, for example, UV light provided by a high-voltage mercury bulb, a medium-voltage mercury bulb, a xenon bulb, a carbon arc lamp, a metal halide bulb, a UV-LED lamp, or sunlight. The wavelength of the applied irradiation is preferably within a range of about 200 to 500 nm, more preferably about 250 to 400 nm. UV energy is preferably within a range of about 30 to 3000 mJ/cm$^2$, and more preferably within a range of about 50 to 250 mJ/cm$^2$. In addition, the bulb can be appropriately selected according to the absorption of the radiation curable topcoat.

In certain embodiments, a primer layer is printed on the substrate and cured. This primer layer can be curable by UV radiation and contain photoinitiators, or it can be curable by EB radiation and not contain photoinitiators. Then, using the wet-trapping method of the present invention, one or more ink layers without photoinitiator are printed on top of the cured primer, and a topcoat with photoinitiator is the last down layer. The final construct is cured by UV radiation at the end of the print run. This embodiment is advantageously used with porous substrates, wherein the printed and cured primer acts to block oxygen, and alleviate oxygen inhibition of the curing of the subsequent layers.

In some embodiments, the wet trapping method of the present invention can be used to laminate a first substrate to a second substrate. In the field of lamination technology, it is known to those skilled in the art that systems exist where an energy curable coating or adhesive is trapped between two layers of substrate; typically between film and paper, or between two films. In all cases, at least one of the substrates must be relatively transparent to wavelength(s) of UV energy that activate the photoinitiator(s) in the energy curable formula.

The energy curable material may be utilized as an adhesive for bonding two substrates together, typically a printed layer and a non-printed layer. In most cases, this technique is used to protect the printed surface by "burying" it inside the laminated structure. In other cases, it is simply an economical way to bond a thermally or chemically resistant layer to another layer, such as a sealant layer, or to bond two layers with different chemical resistance or gas barrier properties together.

Alternatively, one of the substrates may carry a graphic pattern which is imprinted into the wet coatings. After curing, typically the imprinting substrate is removed after curing to reveal the pattern. The most common example is Cast and Cure™ technology, but it is not limited to this.

In some cases, it is advantageous to use two different formulations, one of which is designed to provide good adhesion to the first substrate, and the second of which is designed to provide good adhesion to the second substrate. Previously, there was nothing that could be done in the event that the photoinitiators were incompatible with one or the other of the desired substrates.

In the present invention, it was demonstrated that cure was achieved inside a laminated structure using two different UV coating formulas in wet-on-wet contact with each other, only one of which contains photoinitiator. Both formulas cure fusing into a continuous layer that adheres to both substrates.

In certain embodiments, one or more energy curable ink and/or coating layers (A) containing photoinitiator can be applied to either or both of the first and/or second substrates. One or more energy curable ink and/or coating layers (B) containing no photoinitiator can be applied to either or both of the first and/or second substrates. Advantageously, at least one of the first or second substrates is transparent to UV radiation. The first and the second substrate can laminated wet face to wet face, or dry face to wet face, and the layers of the lamination construct are cured simultaneously through one of the substrates that is transparent to UV radiation.

As discussed above, oxygen inhibition is detrimental to EC curing. It is known that the presence of amines, most specifically tertiary amines, is a great benefit in the reduction of oxygen inhibition. The level of amine that is required must be determined experimentally for each individual ink type and can vary from as little as 4% or less of a formula by weight for a material such as 2-ethylhexyl-4-dimethyl-aminobenzoate, to upwards of 8% or more for amino acrylates formed as Michael addition adducts (e.g. diethanolamine-1,6-HDDA or diethyl amine-TPGDA). Advantageously, in the case of the outer layers (primer and topcoat) the presence of amino acrylate is highly beneficial for inhibiting the deleterious effects on cure of oxygen. When a Type II photoinitiator is being used, the amino acrylate is doubly important as a synergist and source of abstractable hydrogen in the free radical generation process. However, even in the case of Type I photoinitiators, the presence of amino acrylates has been shown to be beneficial (Husar, et al. "Novel phosphine oxide photoinitiators," *RadTech International Proceeding*, 2014). While it is not strictly necessary for amino acrylates to be present in the non-photoinitiated intermediate layers in order to achieve full cure, it does appear to be beneficial.

It is not absolutely necessary to have a primer as the first down layer. This is particularly the case when an oxygen impervious substrate (e.g. a polymeric film) is being printed. However, on oxygen permeable substrates such as porous papers, it is best practice to use a primer. Coated papers represent an intermediate case where, depending on the porosity of the paper, a primer may or may not be required. When used, a primer can modulate adhesion to the substrate independently of the ink vehicles. In theory, there should be no reason for substrate specific ink vehicles to be used at all. The same ink can be used in any construction so long as the ink sticks to the primer. Likewise, the topcoat does not need to be formulated specifically to adhere to the substrate. As long as the topcoat adheres to the ink(s) and the primer underneath, the entire composite will perform at an acceptable level.

In practice, topcoats typically use a blend of Type I and II photoinitiators and amino acrylate as the initiator/synergist package. Usually, about 3% of photoinitiator is needed in order to consume the oxygen present in/around the topcoat layer. A good blend has been found to be one part Type I to two parts Type II. A typical initiator/synergist composition has been found to be 3% Type I photoinitiator (such as hydroxycyclohexyl phenyl ketone), 6% Type II photoinitiator (such as benzophenone) and 9% amino acrylate (such as the adduct of diethyl amine and tripropylene glycol diacrylate (TPGDA) (e.g. Miwon Photocryl A101 or Allnex P115).

The intermediate ink layers can be formulated with or without amino acrylate as required, but typically up to 5% or more is beneficial as a cure accelerator. Amino acrylates are almost always used as standard components in UV flexographic inks, so for the liquid ink case this is not a major change from current practices. For paste inks, amino benzoates such as 2-ethylhexyl-4-dimethylaminobenzoate have long been used in lithographic ink formulas without incident. There has historically been a fear that amino acrylates have deleterious effects on water pick-up values for paste ink types. But, it should be recognized that while this is the case where the starting materials for preparation of the Michael adduct are alkanolamines, there is no evidence that similar concerns apply for alkylamines that do not contain —OH groups.

The primer layer typically functions best with a Type I photoinitiator that is a long wavelength UV receptor since those wavelengths have the deepest penetration into the material to be cured. Phosphine oxides (TPO, TPO-L and BAPO) at a 3% level paired with 9% amino acrylate is typically sufficient for curing the primer, since there is relatively little dissolved oxygen down at the primer level once it has been covered with ink(s) and topcoat.

In another embodiment, a first layer (either a primer layer or ink layer) containing photoinitiator(s) would be deposited, but not cured, then all subsequent layers would be inks and/or coatings (optionally including a topcoat) which do not contain photoinitiator(s). The entire construct would be cured in a final stage that includes either a UV-LED lamp or UV mercury vapor lamp, or a combination of both. This is what can be described as "bottom-up" cure.

In certain embodiments, the inks and/or coatings of the method of the present invention are formulated in accordance with the method of Sun Chemical U.S. Pat. No. 9,365,064. U.S. Pat. No. 9,365,064 describes a method of wet-trapping printing that minimizes or eliminates "back-trapping." Back-trapping is an undesirable effect wherein a first print layer picks up a subsequent print layer and redeposits it onto the subsequent plates and rollers in the printing press, causing print defects.

Although it is preferred that layers specified as containing no photoinitiators (i.e. energy curable ink and/or coating layers (B)) be completely free of added photoinitiator, it is possible to add small amounts of photoinitiators to these layers. Preferably, the amount of photoinitiator added would be insufficient for the layer to react with UV light to form a hard, cured film on its own. Dependent upon the ink type and actual photoinitiators chosen, the photoinitiator content in such cases would typically be less than 6%, or less than 5%, and more preferably less than 4%, or less than 2%, or less than 1%, and most preferably less than 0.5%.

In a preferred embodiment, the method of the present invention would include wet-trapping of inks all of which comprise at least some degree of energy curing materials, and optionally photoinitiator. In one embodiment, the inks used in the wet-trapping method of the present invention would be essentially all energy curable materials (with the possible exception of including small amounts of various additives and/or inert resins). In this embodiment, the energy curing materials are typically present in an amount of greater than or equal to 90% by weight, and preferably greater than or equal to 95% by weight.

In certain embodiments, hybrid inks, containing both energy curing materials and non-energy curing materials typically used in conventional solvent-based, oil-based, and water-based inks may be used. In the case of hybrid inks, the amount of energy curing materials would generally be greater than or equal to 40% by weight, or greater than or equal to 45% by weight, or greater than or equal to 50% by weight, or greater than or equal to 60% by weight, or greater than or equal to 70% by weight, or greater than or equal to 80% by weight, or greater than or equal 90% by weight or greater than or equal to 95% by weight, depending on the type of formulation. When hybrid inks containing fugitive materials are used, the construct can be dried with heat prior to the curing by UV radiation at the end of the print run. However, in some embodiments it is not necessary to heat dry the hybrid inks prior to UV curing (for example, one instance would be if the hybrid ink contains conventional resins, but no solvent).

The present invention would typically not include the wet-trapping of traditional solvent-based (especially oil-based) and water-based inks that are free of energy curing materials. Traditional solvent-based, oil-based, and water-based inks and coatings can be defined as those that are substantially free of energy curing materials. Such inks are typically comprised of resins, solvents, various additives, and optionally colorants. When wet-trapping traditional solvent-based, oil-based, and water-based inks, they will typically not adequately release enough solvent from the printed film prior to the printing of the next layer. They would thus not be suitable for overprinting with a subsequent ink or coating layer that contains energy curing materials, and this will compromise the integrity of the overall multi-ink layer print construct. When using solvent-based, oil-based, and water-based inks in conjunction with the wet-trapping method of the present invention, these solvent-based, oil-based, and water-based inks would preferably be fully dried (not wet-trapped) before using the wet-trapping method of the present invention on subsequent ink layers.

The method of the present invention typically employs energy curing of the inks and/or coatings with UV radiation. The method of the present invention is not limited to any specific range of wavelength of UV radiation, and generally works over the entire UV wavelength range for which photoinitiators are currently available, about 250 nm to 415 nm. However, the method of the present invention is not limited to photoinitiators within this range. As the range of wavelengths at which photoinitiators expands (e.g. 200 nm to 500 nm), the method of the present invention would still be applicable to the expanded range of wavelengths.

Energy curing materials can be broadly defined as those that are polymerizable when exposed to various forms of radiation (e.g. UV, EB, LED, etc.). The inks and coatings suitable for use in the wet-trapping method of the present invention are not bound by any particular formulation requirements, although they would preferably all contain energy curing materials. The most common categories of energy curing materials are listed below.

Examples of suitable monofunctional ethylenically unsaturated monomers include but are not limited to isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acylate; stearyl acrylate; iso-stearyl acrylate; behenyl acrylate; tetrahydrofurfuryl acrylate; 4-t.butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate. Equivalent methacrylate compounds are also capable of being used.

Examples of suitable multifunctional ethylenically unsaturated monomers include but are not limited to the following 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate. Equivalent methacrylate compounds are also capable of being used.

In certain embodiments, bisphenol-A epoxy diacrylate is used as an energy curing material in one or more of the ink and/or coating layers suitable for use in the method of the present invention.

In other embodiments, the bisphenol-A epoxy diacrylate can be replaced with grafted polystyrene (rPS). Grafted recycled polystyrene resins are taught in WO 2017/139333. For example, the depolymerized polystyrene resin can be modified with reactive monomers, oligomers, and polymers that react with the radicals introduced by the action of the catalyst, the initiator, and/or other depolymerizing means. Such monomers may include, for example, (meth) acrylic acid, (meth) acrylates and styrene, and the like. In other embodiments, urethane acrylates or recycled polyethylene terephthalate (rPET) can be used.

Examples of other functional monomer classes capable of being used in part in these formulations include cyclic lactam such as N-vinyl Caprolactam; N-vinyl oxazolidinone and N-vinyl pyrrolidone, and secondary or tertiary acrylamides such as acryloyl morpholine; diacetone acrylamide; N-methyl acrylamide; N-ethyl acrylamide; N-isopropyl acrylamide; N-t.butyl acrylamide; N-hexyl acrylamide; N-cyclohexyl acrylamide; N-octyl acrylamide; N-t.octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide. Energy curable resins, such as, for example, ketone resins, may also be used.

Oligomeric and polymeric acrylates can also be included in the energy curable inks and/or coatings. Such oligomeric and polymeric acrylates include, but are not limited to, epoxy acrylates, polyester acrylates, acrylated polyurethanes, acrylated polyacrylates, acrylated polyethers, acrylated polyamines, acrylated polyglycols, acrylated epoxidized oils based on linseed oil and soybean oil and mixtures thereof, and the like. Suitable water-soluble or water-dispersible acrylates are, for example, highly ethoxylated multifunctional acrylates such as polyethylene oxide diacrylates or ethoxylated trimethylol propane triacrylates, ethoxylated pentaerythritol triacrylates or epoxy acrylates, such as alkane diglycidylether diacrylates, polyglycerol diacrylates or aqueous acrylated polyurethane acrylate dispersions such as Bayhydrol UV2280 and UV2282 (Trademark of Bayer Company).

Suitable photoinitiators include, but are not limited to α-hydroxyketones, acylphosphine oxides, α-aminoketones, thioxanthones, benzophenones, phenyl glyoxylates, oxime esters, acetophenones, benzil compounds and derivatives thereof, fluorenones, anthraquinones, combinations thereof, and the like.

Suitable α-hydroxyketone photoinitiators include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-Hydroxy-1-[1-[4-(2-hydroxy-2-methylpropanoyl)phenyl]-1,3,3-trimethylindan-5-yl]-2-methylpropan-1-one and 2-Hydroxy-1-[4-[4-(2-hydroxy-2-methylpropanoyl)phenoxy]phenyl]-2-methylpropan-1-one; combinations thereof; and the like.

Suitable acylphosphine oxide photoinitiators include, but are not limited to: 2,4,6-trimethylbenzoyl-diphenylphosphine oxide; ethyl (2,4,6-trimethylbenzoyl)phenyl phosphinate; and bis-(2,4,6-trimethylbenzoyl)-phenylphosphine oxide; combinations thereof; and the like.

Suitable α-aminoketone photoinitiators include, but are not limited to: 2-methyl-1-[4-methylthio)phenyl]-2-morpholinopropan-1-one; 2-benzyl-2-dimethylamino-1-(4-morpholinophenyl)-butan-1-one; and 2-dimethylamino-2-(4-methyl-benzyl)-1-(4-morpholin-4-yl-phenyl)-butan-1-one; combinations thereof; and the like.

Suitable thioxanthone photoinitiators include, but are not limited to: 2-4-diethylthioxanthone, isopropylthioxanthone, 2-chlorothioxanthone, and 1-chloro-4-propoxythioxanthone; combinations thereof; and the like.

Suitable benzophenone photoinitiators include, but are not limited to: benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate and 1-[-4-[benzoylphenylsulpho]phenyl]-2-methyl-2-(4-methylphenylsulphonyl)propan-1-one; combinations thereof; and the like.

Suitable phenylglyoxylate photoinitiators include, but are not limited to: phenyl glyoxylic acid methyl ester; oxyphenyl-acetic acid 2-[hydroxyl-ethoxy]-ethyl ester, or oxyphenyl-acetic acid 2-[2-oxo-2-phenyl-acetoxy-ethoxy]-ethyl ester; combinations thereof, and like.

Suitable oxime ester photoinitiators include, but are not limited to: 1-phenyl-1,2-propanedione-2-(O-ethoxycarbonyl)oxime; [1-(4-phenylsulfanylbenzoyl)heptylideneamino] benzoate, or [1-[9-ethyl-6-(2-methylbenzoyl)carbazol-3-yl]-ethylideneamino]acetate; combinations thereof; and the like.

Examples of other suitable photoinitiators include diethoxy acetophenone; benzil; benzil dimethyl ketal; titanocen radical initiators such as titanium-bis(η5-2,4-cyclopentadien-1-yl)-bis-[2,6-difluoro-3-(1H-pyrrol-1-yl)phenyl]; 9-fluorenone; camphorquinone; 2-ethyl anthraquinone; combinations thereof; and the like.

Polymeric photoinitiators and sensitisers are also suitable, including, for example: polymeric aminobenzoates (GENOPOL AB-1 or AB-2 from RAHN, Omnipol ASA from IGM or Speedcure 7040 from Lambson); polymeric benzophenone derivatives (GENOPOL BP-1 or BP-2 from RAHN, Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitiser Omnipol SZ from IGM.

As discussed, an amine synergist may also be included in the energy curable inks and coatings suitable for use with the method of the present invention. Suitable examples include, but are not limited to aromatic amines, aliphatic amines, aminoacrylates and amine modified polyether acrylates.

The inks and/or coatings may further comprise one or more additives typically used in inks and coatings. Such additives include, but are not limited to, colorants (e.g. pigments or dyes), release additives, flow additives, defoamers, and the like.

Examples of suitable organic or inorganic pigments include, but are not limited to, carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include, but are not limited to, azo dyes, anthraquinone dyes, xanthene dyes, azine dyes, combinations thereof and the like.

Commercial organic pigments classified according to Color Index International according to the following trade designations, blue pigments PB1, PB15, PB15:1, PB15:2, PB15:3, PB15:4, PB15:6, PB16, PB60; brown pigments PBS, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments P05, P015, P016, P031, P034, P036, P043, P048, P051, P060, P061 and P071; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

Examples of suitable release additives include, but are not limited to, acrylated additives such as Evonik's TEGO Rad 2200N, 2250, 2300, 2500, 2600, 2650 & 2700 and similar; or Altana's BYK UV 3500, 3505, 3510, 3530, 3570 and similar; or Dow Corning's DC-31; or any other EC reactive system intended for similar effects. Also applicable are non-acrylated additives suitable for use in EC systems such as Evonik's TEGO Glide 100 & 440, Altana's BYK-306, 307, 333, 337, 371, 373, 375, & 377; Dow Corning's DC-57; Erbeck-1; Wacker Chemie's ADDID 100, 130, 140, 151, & 170. Other materials include all known to those of ordinary skill in the art to be useful for modification of high solids inks and coatings.

Examples of suitable flow additives include, but are not limited to, acrylated additives such as Evonik's TEGO Rad 2100, 2200N, 2250, & 2300, and similar; or Altana's BYK UV 3500, 3505, 3510, 3530, 3570 and similar; or Dow Corning's DC-31; or any other EC reactive system intended for similar effects. Also applicable are non-acrylated additives suitable for use in EC systems such as Evonik's TEGO Glide 100 & 440, Altana's BYK-306, 307, 333, 337, 371, 373, 375, & 377; Dow Corning's DC-57; Erbeck-1; Wacker Chemie's ADDID 100, 130, 140, 151, & 170. Other materials include all known to those of ordinary skill in the art to be useful for modification of high solids inks and coatings.

Suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from EVONIK. Available from BYK are BYK-066N, 088, 055, 057, 1790, 020, BYK-A 530, 067A, and BYK 354.

In certain embodiments, one or more of the energy curable ink and/or coating layers may comprise one or more non-reactive resins. In some embodiments, the non-reactive resins are soluble in monomer, such as, for example, acrylates and methacrylates. Suitable examples of non-reactive resins include, but are not limited to, modified polystyrene, modified polyester, ketone resins, combinations thereof, and the like.

The particular formulation of the inks and/or coatings used in the method of the present invention can be varied, as long as the inks and/or coatings are capable of being cured by UV radiation, either due to their containing photoinitiators, or due to the wet-trapping cure phenomenon described in the present invention. The inks and/or coatings can be of any type typically used for virtually any printing process. For example, but not limited to, lithographic, flexographic, gravure, digital (e.g. ink jet), screen, and combinations thereof, printing methods can be used.

In another embodiment, the print construct can include depositing and fully curing one or more of ink and/or coating layers (UV curable, solvent-based, water-based, etc.) prior to subsequently applying further ink and/or coating layers using the wet-trapping method of the present invention.

In another embodiment, the print construct can include applying ink and/or coating layers using the wet trapping method of the present invention, and then subsequently applying one or more further ink and/or coating layers (UV curable, solvent-based, water-based, etc) over the top that may or may not be wet-trapped.

In one embodiment, a water-based coating that contains a certain amount of monomer, synergist (amine), and photoinitiator could be used as the photoinitiated topcoat in the wet trapping process that initiates the cure in the underlying uninitiated layers.

EXAMPLES

The following examples illustrate specific aspects of the present invention and are not intended to limit the scope thereof in any respect and should not be so construed. The following examples illustrate specific aspects of the present water-based coating compositions. The examples are merely exemplary and are not to be construed as limiting the scope of subject matter claimed on the basis of the present disclosure. All parts and percentages are by weight (wt % or mass % based on the total weight), unless specified otherwise.

Test Methods
Finger Rub Test

Mar resistance is assessed by using a finger rub test. A finger is rubbed back and forth, with force typical of holding and manipulating a printed article, on the top layer of the cured construct. If the printed layers remain intact, the construct passes the finger rub test. If one or more of the printed layers smears, or is marred, then the construct fails the finger rub test. The primary purpose of the test is to evaluate surface curing.

Thumb-Twist Test

A thumb is pressed with force on the top layer of the cured construct, and turned by 90 degrees. If the printed layers remain intact, the construct passes the thumb-twist test. If there is marring or damage to one or more of the printed layers (typically a failure of the bond between the substrate and the ink/coating), then the construct fails the thumb-twist test. The primary purpose of the test is to evaluate through curing.

Solvent Rub Test

A cotton ball is soaked with methylethyl ketone (MEK), and rubbed back and forth (i.e a double rub) on the top layer of the cured construct. The number of double rubs before there is damage to the cured construct is recorded. Preferably, the construct withstands more than 50 double rubs, preferably more than 100 double rubs, and more preferably more than 500 double rubs.

Adhesion Test

A piece of 3M 810 adhesive tape is placed on top of the cured construct, and smoothed to adhere the tape to the top layer of the construct. The tape is pulled off quickly at a 90° angle. If the printed and cured layers remain adhered to the substrate, then the construct passes the adhesion test. If greater than 10% of the printed and layers are removed from the substrate, than the construct fails the adhesion test.

Four samples of each print construct were prepared (unless specified otherwise), and the test results reported below are the average of the four samples.

Example 1. Construct of: Uncoated Paper/Primer with Photoinitiator/Ink without Photoinitiator/Topcoat with Photoinitiator Four print constructs were prepared on an uncoated paper substrate. The layers printed on the substrate were: primer with photoinitiator/ink without photoinitiator/topcoat with photoinitiator.

A primer containing methyl benzoyl formate (Type II) and ethyl(2,4,6-trimethylbenzoyl)phenyl phosphinate (TPO-L) (Type I) as photoinitiators, with an adduct of diethanolamine and hexane-1,6-diol diacrylate (1,6-HDDA) as synergist was formulated. This was primer 1 ("P1"). P1 was a paste. The formulation of P1 is shown in Table 1.

TABLE 1

| Formulation of P1 | |
|---|---|
| Material | % |
| Methyl benzoyl formate | 4.76 |
| TPO-L | 4.76 |
| Amino acrylate (Allnex Ebecryl 7100 or equivalent) | 7.22 |
| Bisphenol A Epoxy Diacrylate (44.63% Allnex Ebecryl 3720)/ 36.52 TMPTA blend | 81.15 |
| Claytone 40 (treated Montmorillonite, Altana/Southern Clay) | 1.76 |
| Aerosil R972 (fumed silica, Evonik/Degussa) | 0.35 |
| Total | 100.00 |

P1 was laid down on uncoated proofing paper (BYK Chart PA-2831) with a Little Joe proofing press, using a 0.4 mil (10 μm) wedge plate.

A series of commercially available Sun Chemical EB lithographic inks were trapped side by side over the primer using the Little Joe press set up. By applying the inks side by side, four constructs, each with a primer/ink/topcoat were prepared. The four inks were: Black 91182306 ("B1") (commercial ID FLUWB943610, DPQ ULT PRO.BLACK from Sun Chemical); Cyan 91182266 ("C1") (commercial ID FLUWB4483612, DPQ ULT PRO.CYAN from Sun Chemical); Magenta 91182373 ("M1") (commercial ID FLUWB4483612, DPQ ULT PRO.MAGENTA from Sun Chemical); and Yellow 91182365 ("Y1") (commercial ID FLUWB2483613, DPQ ULT PRO.YELLOW from Sun Chemical) (part of the Sunbeam series from Sun Chemical).

A commercially available UV flexographic coating, RCSFV0343453 (Sun Chemical) ("T1"), was trapped over the EB inks and primer using a 2-roll hand proofer with a 165 lines per inch anilox roller.

The trapped wet layers were all cured simultaneously at a line speed of 98 ft/min (29.9 m/min) with a medium pressure mercury vapor UV lamp set at 400 Watts/in (160 W/cm) input power.

Complete cure of all layers resulted.

Example 2. Construct of: Coated Paper/Primer with Photoinitiator/Ink without Photoinitiator/Topcoat with Photoinitiator Example 2 is a repeat of Example 1, except that the substrate was coated paper, BYK Chart 2810. Curing conditions were identical to Example 1. Again, complete cure of all layers resulted. There was no smear or thumb-twist failure on portions of the print that were covered by the topcoat. On areas where the lower layers were not fully covered by the topcoat, only the black showed a tendency to smear. This demonstrates that it is possible to achieve "bottom up" cure even if a photoinitiator containing topcoat is absent.

Example 3. Construct of: Uncoated Paper/Primer with Photoinitiator/Ink Layer without Photoinitiator/Ink Layer without Photoinitiator/Topcoat with Photoinitiator Example 3 shows effective wet trapping of two non-photoinitiated black ink layers sandwiched between a photoinitiated primer layer and a photoinitiated topcoat layer on uncoated paper. It is noteworthy in that print density of the black is higher than what can typically be cured in a UV black ink.

A thicker (tackier) primer was formulated to help minimize the degree to which back-trapping of the primer into the colors occurred. The formulation of primer 2 ("P2") is shown in Table 2.

TABLE 2

| Formulation of P2 | |
|---|---|
| Material | % |
| Methyl benzoyl formate | 4.48 |
| TPO-L | 4.39 |
| amino acrylate (Allnex Ebecryl 7100 or equivalent) | 8.96 |
| Bisphenol A Epoxy Diacrylate/TMPTA blend (38.91% Allnex Ebecryl 3720)/(31.83% TMPTA) | 70.74 |
| 928-51 (internal Sun Chemical resin, fatty acid adduct of Bisphenol A Epoxy Diacrylate) | 8.79 |
| Claytone 40 (treated Montmorillonite, Altana/Southern Clay) | 1.67 |
| Aerosil R972 (fumed silica, Evonik/Degussa) | 0.97 |
| Total | 100.00 |

Primer P2 was printed on uncoated paper stock (BYK Chart PA-2831) with a Little Joe proofing press using a 0.4 mil (10 μm) wedge plate. Two layers of black EB lithographic ink (both B1) were trapped over the primer with the previously mentioned Little Joe setup using variations in laydown thickness known to those skilled in the art in order to ensure clean transfer from the blanket to the substrate. T1 topcoat was trapped over the entire construction using the Little Joe proofing press. The entire construction was cured using a medium pressure mercury vapor lamp at 400 W/in (160 W/cm) lamp input power, and at a speed of 150 ft/min (45.7 m/min).

All layers cured to a highly acceptable level.

The print densities of the black inks were higher than usual. Typically a black ink printed at a density greater than 2.2 is difficult to cure. The density of the construction of Example 3 averaged 2.35, with a sample deviation of 0.01, n=5. In a typical black UV ink with photoinitiator content in the 9% to 12% range, the ink alone would not cure at this print density. Putting a UV coating over the ink might help with the smudge resistance, but typically there would still be poor bond between the ink and the substrate, and the cured construction would fail the thumb twist test. The construction of Example 3 could neither be rubbed nor thumb-twisted off of the substrate demonstrating the efficacy of the method of the present invention. It should be noted that the method of the present invention would be expected to effectively cure even higher densities than the 2.35 shown here with the proper formulation of the individual layers (i.e. type and amount of photoinitiators and/or amines in the ink and/or coatings).

Example 4. Construct of: Uncoated Paper/Primer with Photoinitiator/Ink without Photoinitiator Example 4 shows effective wet trapping of a non-photoinitiated ink layer printed over the top of a photoinitiated primer, on uncoated paper. No topcoat layer was used.

P2 was laid down on uncoated proofing paper (BYK Chart PA-2831) with a Little Joe proofing press, using a 0.4 mil (10 μm) wedge plate.

A series of commercially available Sun Chemical EB lithographic inks were trapped side by side over the primer using the Little Joe press set up. By applying the inks side by side, four constructs, each with a primer/ink/topcoat were prepared. The four inks were B1, C1, M1, and Y1 as described above.

Two Example 4 constructs were prepared, and cured at different speeds, using a medium pressure mercury vapor lamp with power input of 400 W/in (160 W/cm).

Construct Example 4A was cured at a line speed of 150 ft/min (45.7 m/min). There was no damage to any color from a simple finger rub, and slight damage to all colors from the thumb-twist test. These are commercially acceptable results.

Construct Example 4B was cured at a line speed of 75 ft/min (22.9 m/min). Neither rub-off nor thumb-twist failure occurred in any color. The powerful effect of the "bottom up" curing method is thereby demonstrated.

Example 5: Construct of: Uncoated Paper/Primer with Photoinitiator/Ink(s) without Photoinitiator/Topcoat with Photoinitiator Example 5 shows successful wet trapping of two layers of ink, of different colors, without photoinitiator sandwiched between a primer containing photoinitiator and a topcoat containing photoinitiator.

All proofs were cured with a medium pressure mercury vapor UV lamp with power input of 400 W/in (160 W/cm), at a line speed of 150 ft/min (45.7 m/min). All proofs cured hard and passed both finger rub and thumb-twist tests without issues.

Ex. 5A (Yellow over Cyan): P2 was applied to uncoated paper (BYK Chart PA-2831). C1 was printed on top of P2; then Y1 was printed on top of C1. Topcoat T1 was applied over all of the layers.

Ex. 5B (Yellow over Magenta): P2 was applied to uncoated paper (BYK Chart PA-2831). M1 was printed on top of P2; then Y1 was printed on top of M1. Topcoat T1 was applied over all of the layers.

Ex. 5C (Magenta over Cyan): P2 was applied to uncoated paper (BYK Chart PA-2831). C1 was printed on top of P2; then M1 was printed on top of C1. Topcoat T1 was applied over all of the layers.

Examples 5A to 5C show effective wet trapping of two non-photoinitiated ink layers (process colors printed in various configurations) sandwiched between a photoinitiated primer and a photoinitiated topcoat layer on uncoated paper. The traps represent the standard set-up for 4-color process printing: black, cyan, magenta, yellow, magenta over cyan trap, yellow over cyan trap and yellow over magenta trap. A trapped color with black is not typically used in 4-color process printing.

Process color trap tests showed good cure for all standard combinations used in 4-color KCMY (i.e. black, cyan, magenta, yellow) process printing. All tests used P2 applied on uncoated paper stock (BYK Chart PA-2831 uncoated paper) with a Little Joe proofing press using a 0.4 mil (10 µm) wedge plate. All colors were from the EB lithographic monotack ink set described in Example 1 (i.e. B1, C1, M1, and Y1). The first down color (cyan blue) was applied by the same method over the primer. The second down color (magenta) was applied by a similar method. The third down color (yellow) was applied over the second down color and primer using modifications to increase the ink film thickness known to those skilled in the art. The UV topcoat was also applied by the same method.

Example 6: Construct of: Uncoated Paper/Primer with Photoinitiator/$1^{st}$ Layer of EB Cyan without Photoinitiator/$2^{nd}$ Layer of EB Cyan without Photoinitiator/Topcoat without Photoinitiator Example 6 shows the successful wet trapping of two cyan non-photoinitiated ink layers sandwiched between a photoinitiated primer layer and a non-photoinitiated topcoat layer on uncoated paper. This construct demonstrates a successful "bottom-up" cure wet trapping construct.

Topcoat 2 ("T2"), not containing photoinitiator, was prepared. The formulation of T2 is shown in Table 3. Energy curable topcoat T2 does not contain photoinitiator, but does contain a large quantity of amino acrylate synergist.

TABLE 3

Formulation of T2

| Material | % |
|---|---|
| EO-TMPTA | 46.9 |
| Bisphenol A Epoxy Diacrylate/TMPTA blend (15.0% Allnex Ebecryl 3720)/(12.3% TMPTA) | 27.3 |
| Adduct of Diethylamine and TPGDA (Allnex Ebecryl P115) | 24.6 |
| Silicone surfactant, Wacker Chemie EXP-3303 | 1.2 |
| Total | 100.0 |

Primer P2 was applied to test stock (BYK Chart PA-2831 uncoated paper) with a Little Joe proofing press using a 0.4 mil (10 µm) wedge plate. Two layers of EB cyan ink (C1) were wet trapped over the primer. A fourth layer, the topcoat, was applied by the method described above. The proofs were cured with a medium pressure mercury vapor UV lamp, with a lamp input power of 400 W/in (160 W/cm) at two levels of UV exposure (line speed).

Ex. 6A (150 ft/min (45.7 m/min)): The proof was cured at a speed of 150 ft/min (45.7 m/min). Rub resistance was tested at 1, 2, 4, and 8 minutes post-cure. The proof was easily marred by rubbing on it with a finger at 1, 2, and 4 minutes post-exposure, but less so at 8 minutes post-exposure.

Ex. 6B (75 ft/min (22.9 m/min)): The proof was cured at a line speed of 75 ft/min (22.9 m/min). Rub resistance was tested at 1, 2, 4, and 8 minutes post-cure. The proof could be easily marred by rubbing on it with a finger at 1 and 2 minutes post-exposure. However, at greater than 4 minutes post-exposure virtually no marring occurred. At greater than 4 minutes post-exposure, this proof would have been considered commercially acceptable. At 2 hours post-exposure, this proof passed 41 MEK double rubs with a cotton ball soaked in MEK.

Example 6 shows that with the proper curing power and formulation of the UV primer (large quantity of amino acrylate synergist), an acceptable bottom-up cure can be achieved with layers of ink(s) and topcoat, as is typically seen in commercial practice, with only the primer layer containing photoinitiator.

Example 7. Wet Trapping Construct with a Primer and a Topcoat Containing Grafted Recycled Polystyrene Example 7 shows that the bisphenol A epoxy diacrylate used in P1 and P2, as well as T1 (Suncure from Sun Chemical) and T2 can be replaced with grafted recycled polystyrene (rPS), and lead to effective wet-trapping.

Example 7 demonstrates that the resin bisphenol A epoxy diacrylate is not critical to the performance of the adjacent cure method. Grafted recycled polystyrene, made by methods described in WO 2017/139333 (Ex. 5; rPS broken down and grafted in toluene and then solvent swapped for TPDGA) was used as the resin for both a primer and topcoat. Various UV lamps were used for curing.

UV primer 3 ("P3") was prepared according to the formulation in Table 4. Note that the photoinitiators have absorption bands in the UVA portion of the spectrum, i.e. wavelengths from 320 nm to 390 nm. The major disadvantage of this primer is that it has a tendency to yellow upon exposure to UV light. If underneath the ink layers, the yellowing is faint enough not to be a problem, but in clear/white areas of the proof it may be unacceptable.

TABLE 4

Formulation of P3

| Material | % |
|---|---|
| Grafted rPS (38.5%) in TPGDA (61.5%) (ref. R3900-150)/ (24.7% grafted rPS)/(39.4% TPGDA) | 64.1 |
| EO-HDDA | 22.5 |
| Ethyl Michlers Ketone (Type II PI and amine synergist) | 2.7 |
| TPO (Type I PI, 2,4,6-Trimethylbenzoyl-diphenyl phosphine oxide) | 3.2 |
| EHA (Amine synergist, 2-Ethylhexyl-4-dimethylaminobenzoate) (ref. R3997-76-1) | 7.5 |
| Total | 100.0 |

UV topcoat 3 ("T3") was prepared according to the formulation in Table 5.

TABLE 5

Formulation of T3

| Material | % |
| --- | --- |
| grafted rPS | 3.5 |
| Isooctyl Acrylate | 4.5 |
| Tricyclodecane Dimethanol Diacrylate | 8.9 |
| Inhibitor (61.5% MEHQ to 38.5% Phenothiazine) | 0.02 |
| Allnex P115 | 11.1 |
| TPGDA | 5.7 |
| (EO)$_3$TMPTA | 54.08 |
| Benzophenone (Type II PI) | 6.6 |
| Hydroxycyclohexyl Phenylketone (Type I PI) | 3.3 |
| TegoRad 2300 (Evonik, acrylate functional flow/release additive) | 0.7 |
| BYK-361N (BYK-Chemie, flow additive) | 0.80 |
| Airex 920 (Evonik, defoamer) | 0.80 |
| Total | 100.00 |

Photoinitiator-free yellow lithographic ink 2 ("Y2") was obtained by procuring a sample of Sun Chemical commercial UV lithographic ink Starluxe G7 Pro Yellow (FLYSV2484086) from the manufacturing facility immediately prior to the addition of the photoinitiator. All other ingredients normally in the formula were present.

A narrow strip of P3 was coated on coated paper (BYK Chart 2810) with a Little Joe proofing press using a 0.4 mil (10 μm) wedge plate. A wider strip of Y2 (i.e. a portion of the strip of Y2 was directly on the substrate, without a primer layer) was trapped over the primer using the same print method. A still wider strip of T3 was applied over all the other layers using a #4 Mayer rod. All the layers were cured simultaneously using a 2-lamp setup at a web speed of 100 ft/min (30.5 m/min) and a 1 to 2 second gap between the lamp exposures.

Lamp #1: UV-LED with peak output at 395 nm, 20 W/cm$^2$ intensity (i.e. irradiance), with a 10 mm air gap.
Lamp #2: UV-Hg-vapor, with a lamp input power of 200 W/in (80 W/cm).

By printing varying widths of each layer, the following constructs were obtained:

Ex. 7A: substrate/T3
Ex. 7B: substrate/Y2/T3
Ex. 7C: substrate/P3/Y2/T3

Rubbing a finger across the print showed that all areas were well cured with good adhesion to the substrate. That is, all constructs 7A (only T3), 7B (Y2 and T3), and 7C (P3, Y2, and T3) had good adhesion to the substrate. Adhesion (tested with 3M 810 tape) was so high on all layers that the clay coating was removed from the paper. The excellent cure allowed for a color density of the yellow=1.16, which is stronger than typically required for process printing.

Example 8. Curing with Only UV-LED

An identical print construct to Example 7 was exposed only to the UV-LED lamp at the same conditions as in Example 7. Areas underlain by UV primer P3 showed good adhesion and rub resistance. Through cure was excellent. The UV topcoat T3 was slightly smeary on the surface as is typical when curing coatings with UV-LED. This example shows that P3 is very effectively activated by UV-LED light and that mercury vapor lamps are not absolutely necessary for achieving through cure.

Example 9. Curing with UV-LED and a Mercury UV Lamp with Lower Power Input

An identical print construct to Example 7 and Example 8 was exposed to UV-LED, and then a pass under a medium pressure mercury vapor UV lamp with 100 W/in (40 W/cm) input power. It was shown that less energy from the mercury vapor lamp is needed than that used in Example 7 to render the topcoat surface tack and smear free. That is, proofs processed with the UV-LED as in Example 7, and then further cured with a mercury vapor lamp set at a lower input power, could be rendered smudge resistant across all regions of the proof (1, 2, or 3 total layers), with as little as 100 W/in (40 W/cm) at 200 ft/min (61 m/min).

Example 10. Formulation Optimization

Example 10 was designed to test formulations with varying amounts of photoinitiators and synergists to optimize the performance of the various inks and/or coatings (i.e. primers, inks, and topcoats).

Examples 10A to 10I were designed to test the effect of varying the amounts of photoinitiators and synergist in one or more layers of the wet-trapping print construct (i.e. inks and/or coatings). It is to be understood that these Examples are non-limiting, and that one of skill in the art of ink and coating formulations could choose different types and amounts of raw materials, based on the required properties of the inks and/or coatings according to the end use.

Primers P4 to P8, containing varying levels of photoinitiator and amine synergist, were prepared to be tested in Examples 10A to 10I. The formulations of primers P4 to P8 are shown in Table 6.

TABLE 6

Formulations of P4 to P8

| | P4 | P5 | P6 | P7 | P8 |
| --- | --- | --- | --- | --- | --- |
| Variplus AP resin | 5.11 | 5.03 | 5.01 | 4.93 | 5.02 |
| Photocryl A101 amino acrylate | 11.16 | 10.98 | 10.95 | 10.78 | 10.97 |
| TPGDA | 25.44 | 25.04 | 24.96 | 24.57 | 25.01 |
| TMPTA | 54.02 | 53.15 | 53.00 | 52.16 | 53.10 |
| Airex 920 | 0.62 | 0.61 | 0.61 | 0.60 | 0.61 |
| TPO-L | 3.65 | 5.19 | 3.58 | 5.00 | 4.39 |
| EMK | | | 1.89 | 1.96 | 0.90 |
| Total | 100 | 100 | 100 | 100 | 100 |

Topcoats T4 to T6 were prepared to be tested in Examples 10A to 10I. The formulations of T4 to T6 are shown in Table 7.

TABLE 7

Formulations of T4 to T6

| | T4 | T5 | T6 |
| --- | --- | --- | --- |
| Grafted rPS | 3.50 | 3.37 | 3.43 |
| Isooctyl acrylate | 4.50 | 4.34 | 4.41 |
| Sartomer SR833S | 8.99 | 8.67 | 8.82 |
| (EO)$_3$TMPTA | 54.47 | 52.53 | 53.43 |
| Photocryl A101 | 11.19 | 10.79 | 10.98 |
| TPGDA | 5.70 | 5.49 | 5.59 |
| 62MEHQ: 38Phenothiazine (inhibitor) | 0.02 | 0.02 | 0.02 |
| Benzophenone | 6.62 | 6.38 | 6.49 |
| Hydroxycyclohexyl phenyl ketone | 3.30 | 3.18 | 3.24 |
| TPO-L | | 3.59 | 1.90 |
| TegoRad 2250 | 0.70 | 0.67 | 0.69 |
| BYK 361N | 0.76 | 0.73 | 0.75 |
| Airex 920 | 0.25 | 0.24 | 0.25 |
| Total | 100 | 100 | 100 |

Yellow energy curable, photoinitiator free, lithographic ink Y2 was used as the intermediate ink layer in all of Examples 10A to 10I.

All runs were performed using BYK Chart 2810 (coated) paper. The first down coating (primer) was applied using a bladed flexographic hand proofer with 800 lines per inch (1.7 bcm volume) anilox. The yellow photoinitiator free ink Y2 was applied using a bladed flexographic had proofer with 360 lines per inch (4.23 bcm volume) anilox. The topcoat was applied using a 2-roll flexographic hand proofer with 440 lines per inch (3.35 bcm volume) anilox. Two proofs were made for each of constructs 10A to 10I.

The constructs used for each of Examples 10A to 10I are shown in Table 8.

TABLE 8

Constructs of Examples 10A to 10I

| | | Layer | | |
|---|---|---|---|---|
| Ex. | Substrate | 1 | 2 | 3 |
| 10A | BYK 2810 coated paper | P4 | Y2 | T4 |
| 10B | BYK 2810 coated paper | P5 | Y2 | T4 |
| 10C | BYK 2810 coated paper | P6 | Y2 | T4 |
| 10D | BYK 2810 coated paper | P7 | Y2 | T4 |
| 10E | BYK 2810 coated paper | P4 | Y2 | T5 |
| 10F | BYK 2810 coated paper | P5 | Y2 | T5 |
| 10G | BYK 2810 coated paper | P6 | Y2 | T5 |
| 10H | BYK 2810 coated paper | P7 | Y2 | T5 |
| 10I | BYK 2810 coated paper | P8 | Y2 | T6 |

Proofs were cured with passes at 100 ft./min (30.5 m/min) under two UV lamps with 1 to 2 seconds between the exposures. The first lamp was a UV-LED lamp (395 nm) set at 67% power, and the second lamp was a medium pressure mercury vapor lamp set at 25% power. The intent was to irradiate with equal dosages (energy density) of each lamp in the UVA portion of the spectrum (320 nm to 390 nm). Theoretical values of UVA exposure for the UV-LED rig were a dosage (energy density) of 57 mJ/cm$^2$, and intensity (irradiance) of 0.60 W/cm$^2$. Theoretical values of UVA exposure or the UV medium pressure mercury vapor rig were a dosage (energy density) of 57 mJ/cm$^2$ and intensity (irradiance) of 0.41 W/cm$^2$. Average measured values for UVA of the combined exposures were 115 mJ/cm$^2$ dosage (energy density) and 0.91 W/cm$^2$ intensity (irradiance). Average measured values for UVB (280 nm to 320 nm) of the combined exposures were 57 mJ/cm$^2$ dosage, and 0.40 W/cm$^2$ intensity. Average measured values for UVC (250 nm to 260 nm) of the combined exposures were 10 mJ/cm$^2$ dosage, and 0.05 W/cm$^2$ intensity. Tape adhesion was tested using 3M 810 adhesive tape, and a value of "excellent" means no adhesive failure occurred within or between the topcoat/ink/primer layers and the substrate, typically the paper coating being pulled off of the paper substrate.

The color density was measured with an X-Rite spectro-densitometer. Gloss over yellow was measured with a BYK micro-TRI-gloss meter at 60 degrees. Values for color density and gloss over yellow for Examples 10A to 10I are shown in Table 9 below.

TABLE 9

Color density and gloss over yellow of Examples 10A to 10I

| Ex. | Color density | Gloss over yellow |
|---|---|---|
| 10A | 0.97 | 86.1 |
| 10B | 1.00 | 86.4 |
| 10C | 1.00 | 86.4 |
| 10D | 0.99 | 89.0 |
| 10E | 0.95 | 89.4 |
| 10F | 1.01 | 89.0 |
| 10G | 1.02 | 89.6 |
| 10H | 1.00 | 88.8 |
| 10I | 0.99 | 87.5 |

The proofs were assessed by finger rub-off, thumb-twist, MEK rub resistance, and tape adhesion. Tests for MEK rub resistance were halted at 1000 rubs because anything greater than 500 MEK rubs is considered excellent from a commercial point of view. The results are shown in Table 10 below.

TABLE 10

Performance of Examples 10A to 10I

| Ex. | Proof | TPO-L in Primer | EMK in Primer | TPO-L in Topcoat | Finger Rub-Off[1] | Thumb-twist[1] | MEK Rubs[1] | Tape Adhesion[1] |
|---|---|---|---|---|---|---|---|---|
| 10A | 1 | 3.65% | 0.00% | 0.00% | No Marring | Slight Marring | 780 | Excellent |
| | 2 | 3.65% | 0.00% | 0.00% | No Marring | Slight Marring | 1000 | Excellent |
| 10B | 1 | 5.19% | 0.00% | 0.00% | V. Slight Marring | Slight Marring | 1000 | Excellent |
| | 2 | 5.19% | 0.00% | 0.00% | V. Slight Marring | Slight Marring | 1000 | Excellent |
| 10C | 1 | 3.58% | 1.89% | 0.00% | V. Slight Marring | Slight Marring | 975 | Excellent |
| | 2 | 3.58% | 1.89% | 0.00% | V. Slight Marring | Slight Marring | 1000 | Excellent |
| 10D | 1 | 5.00% | 1.96% | 0.00% | No Marring | V. Slight Marring | 1000 | Excellent |
| | 2 | 5.00% | 1.96% | 0.00% | No Marring | V. Slight Marring | 1000 | Excellent |
| 10E | 1 | 3.65% | 0.00% | 3.59% | No Marring | No Marring | 1000 | Excellent |
| | 2 | 3.65% | 0.00% | 3.59% | No Marring | No Marring | 1000 | Excellent |

TABLE 10-continued

Performance of Examples 10A to 10I

| Ex. | Proof | TPO-L in Primer | EMK in Primer | TPO-L in Topcoat | Finger Rub-Off[1] | Thumb-twist[1] | MEK Rubs[1] | Tape Adhesion[1] |
|---|---|---|---|---|---|---|---|---|
| 10F | 1 | 5.19% | 0.00% | 3.59% | V. Slight Marring | V. Slight Marring | 1000 | Excellent |
|  | 2 | 5.19% | 0.00% | 3.59% | V. Slight Marring | V. Slight Marring | 1000 | Excellent |
| 10G | 1 | 3.58% | 1.89% | 3.59% | No Marring | No Marring | 1000 | Excellent |
|  | 2 | 3.58% | 1.89% | 3.59% | No Marring | No Marring | 990 | Excellent |
| 10H | 1 | 5.00% | 1.96% | 3.59% | No Marring | No Marring | 1000 | Excellent |
|  | 2 | 5.00% | 1.96% | 3.59% | No Marring | No Marring | 1000 | Excellent |
| 10I | 1 | 4.39% | 0.90% | 1.90% | Slight Marring | Borderline Pass | 1000 | Excellent |
|  | 2 | 4.39% | 0.90% | 1.90% | Slight Marring | Borderline Pass | 1000 | Excellent |

[1]All of the finger rub-off, thumb-twist, MEK rubs, and tape adhesion test results in Table 9 are considered acceptable.

One of the formulation parameters examined was the effect of including an amine synergist in one or more of the ink and/or coating formulations in a construct. For example, while amine synergist may be present in any of the ink and/or coating layers, Examples 10A to 10I show that as long as the primer or topcoat, or both, contain an amine synergist, then it is not necessary to include an amine synergist in the intermediate ink layers to achieve good performance.

Example 11. Curing of Construct 10E with UV Mercury Lamp Only

The construct used in Example 10E was prepared, and cured with only UV medium pressure mercury vapor lamp (i.e. the UV-LED lamp was turned off). The total UV dosage and intensity was the same as in Example 10. The medium pressure mercury vapor lamp was increased to 50% power, with the line speed at 100 ft/min (30.5 m/min). This ensured that the same UV dosage was received in the UVA range as for Example 10E.

Thumb-twist and finger-rub results were comparable to Example 10E. Color density averaged 0.98, slightly higher than Example 10E. Gloss over yellow measured at 60° averaged 92.3, significantly higher than Example 10E. Higher gloss is usually indicative of more complete cure. However, the variability of both the density and gloss values was higher in this example than for Example 10E (e.g. standard deviations of 0.07 vs. 0.01 for density and 0.8 vs 0.2 for 60° gloss). Tape adhesion was excellent, and was identical to Example 10E.

Example 12. Wet Trapping on Polymeric Polyester Film Substrate with LED Curing

Wet trapping print constructs of untreated polyester film Sarafil (Polyplex Company)/EB curable lithographic process ink without photoinitiator (Sunbeam series from Sun Chemical)/LED curable topcoat. The inks used were Sunbeam ELM 46 black ("B2"), Sunbeam ELM 25 cyan ("C2"), Sunbeam ELM 27 magenta ("M2"), and Sunbeam ELM 26 yellow ("Y3"). The LED topcoat was either LED012 from Kustom-Group Company ("T7") or topcoat "T8," the formulation of which is shown in Table 11. The viscosity of T8 was 190 mPas, measured at a temperature of 25° C., and a shear rate of D=50 1/s.

TABLE 11

Formulation of LED topcoat T8

| Raw materials | Weight % |
|---|---|
| Trimethylolpropane triacrylate | 26.20 |
| Dipropylene glycol diacrylate | 18.00 |
| Bisphenol-A-diglycidylether-diacrylate | 32.00 |
| Aminoacrylate (adduct of GPTA and diethylamine) | 10.30 |
| Polymerization inhibitor | 0.30 |
| Defoamer | 0.20 |
| Slip additive | 0.20 |
| Phenyl-bis(2,4,6-trimethyl-benzoyl)-phosphineoxide | 1.00 |
| Ethyl (2,4,6-trimethylbenzoyl) phenyl phosphinate | 4.00 |
| 2-Isopropylthioxanthone (ITX) | 2.60 |
| Ethyl-N,N-dimethylaminobenzoate (EDB) | 5.00 |
| Ditrimethylolpropane tetraacrylate (DITMPTA) | 0.20 |
| Total | 100.00 |

The lithographic inks were applied on the plastic substrates with the offset ink lab proofer C-5 from IGT Company. The distributor rolls were coated with 250 mg of ink and run for 2 minutes, before the ink was set-off to the ink roller for 1 minute. Then, the ink prints were done. Immediately after the application of the ink, topcoat was applied wet on wet. The LED topcoat was applied with an anilox roller (200 lines per inch) using an automated coating unit from BYK-Gardner, which gave a film weight of about 4 g/m$^2$.

The wet trapped layered prints were LED-cured with two passes with a Phoseon LED dryer (8 W at 395 nm). The applied doses of energy were measured with the radiometer Powerpuck-II from EIT Company. The applied doses were UVA=7.5 mJ/cm$^2$, UVA2=58.0 mJ/cm$^2$, and UVV=125 mJ/cm$^2$ per pass.

The degree of surface cure was assessed by the thumb-twist test, where the thumb was pressed on the surface of the print construct with moderate force and twisted. If no smearing or significant marks were formed, then the cured layers passed the test.

Through cure was assessed using a "set-off" test at the back side of the LED cured ink. The UV-cured prints of inks, which were printed with optical densities of 1.6 to 2.2, were removed together with the cured topcoat from the plastic substrates by a strong adhesive film and the ink back side was covered with a white counter paper. Then, with a pressure of 10 tons, the back-side of the printed ink and the plain counter paper were pressed together. The pressure was increased to 10 tons within about 5 seconds, and once the pressure of 10 tons was reached on the pressure indicator, the pressure was immediately released. The counter paper was then removed from the print, and the amount of transferred ink on the counter paper was measured by a densitometer. As a rule, the lower the amount of transferred ink, the lower the readings on the densitometer, and the better the cure. A good cured ink shows a transferred optical density of less than 0.1 units.

The results for the surface cure and through cure are shown in Table 12.

TABLE 12

Cure assessment of Examples 12A to 12H.

| | Ex. 12A | Ex. 12B | Ex. 12C | Ex. 12D | Ex. 12E | Ex. 12F | Ex. 12G | Ex. 12H |
|---|---|---|---|---|---|---|---|---|
| Ink | Y3 | C2 | M2 | B2 | Y3 | C2 | M2 | B2 |
| LED-Coating | T7 | T7 | T7 | T7 | | | | |
| LED-Coating | | | | | T8 | T8 | T8 | T8 |
| Printed optical density (units) | 1.64 | 2.1 | 1.96 | 2.2 | 1.67 | 2.1 | 1.96 | 2.01 |
| Thumb twist test on top coating | pass | pass | pass | pass | pass | pass | pass | pass |
| Set-off test on Ink back side (optical density units) | 0.01 | 0.02 | 0.03 | 0.06 | 0.01 | 0.02 | 0.02 | 0.05 |

The set-off curing test results in Table 12 indicate that the EB-inks are fully cured underneath the LED topcoat, even though the EB inks contain no photoinitiator. Comparative experiments with inks Y3, C2, M2, and B2 without the LED topcoat did not show any degree of cure and failed the curing tests.

Thus, Examples 12A to 12H show effective wet trapping of a non-photoinitiated process ink layer beneath a photoinitiated topcoat on untreated polyester film using UV-LED radiation to cure the system.

Example 13. Wet Trapping on Polymeric Polypropylene Film

Example 13 is the same as Example 12, except that untreated oriented polypropylene H1-LS film (Jindal Polyfilms) was used as the substrate. The cure assessment results are shown in Table 13.

TABLE 13

Cure assessment of Examples 13A to 13H

| | Ex. 13A | Ex. 13B | Ex. 13C | Ex. 13D | Ex. 13E | Ex. 13F | Ex. 13G | Ex. 13H |
|---|---|---|---|---|---|---|---|---|
| Ink | Y3 | C2 | M2 | B2 | Y3 | C2 | M2 | B2 |
| LED-Coating | T7 | T7 | T7 | T7 | | | | |
| LED-Coating | | | | | T8 | T8 | T8 | T8 |
| Printed optical density (units) | 1.85 | 1.79 | 1.97 | 2.10 | 1.85 | 2.10 | 1.96 | 2.01 |
| Thumb twist test on top coating | pass | pass | pass | pass | pass | pass | pass | pass |
| Set-off test on Ink back side (optical density units) | 0.01 | 0.02 | 0.03 | 0.07 | 0.01 | 0.02 | 0.02 | 0.04 |

The set-off curing test results in Table 13 indicate that the EB ink is fully cured underneath the LED topcoat, even though the EB ink contains no photoinitiator. Comparative experiments with inks Y3, C2, M2, and B2 without the LED topcoat did not show any degree of cure and failed the curing tests.

Example 14. Wet Trapping on Polymeric Polyethylene Terephthalate Film

Example 14 is the same as Example 12, except that untreated polyethylene terephthalate Mylar 813 (Du Pont) film was used as the substrate. The cure assessment results are shown in Table 14.

TABLE 14

Cure assessment of Examples 14A to 14H

| | Ex. 14A | Ex. 14B | Ex. 14C | Ex. 14D | Ex. 14E | Ex. 14F | Ex. 14G | Ex. 14H |
|---|---|---|---|---|---|---|---|---|
| Ink | Y3 | C2 | M2 | B2 | Y3 | C2 | M2 | B2 |
| LED-Coating | T7 | T7 | T7 | T7 | | | | |
| LED-Coating | | | | | T8 | T8 | T8 | T8 |
| Printed optical density (units) | 1.68 | 1.89 | 1.95 | 2.10 | 1.67 | 1.80 | 1.93 | 2.11 |
| Thumb twist test on top coating | pass | pass | pass | pass | pass | pass | pass | pass |
| Set-off test on Ink back side (optical density units) | 0.01 | 0.01 | 0.03 | 0.07 | 0.01 | 0.02 | 0.02 | 0.06 |

Example 15. Construct of: Uncoated Paper/Primer without Photoinitiator/Black Ink with Photoinitiator Example 15 shows effective wet trapping of a photoinitiated black ink printed over top of a non-photoinitiated primer on uncoated paper, with simultaneous curing of layers.

Primers made of UV-curable materials (without photoinitiator) (P9 to P11) were applied to uncoated testing paper BYK Chart PA-2831 and overprinted with a black ink containing photoinitiator. The formulations of primers P9 to P11 are shown in Table 15, and the formulations of black inks B3 and B4 are shown in Table 16.

TABLE 15

Formulations of primers P9 to P11

| Materials | P9 | P10 | P11 |
|---|---|---|---|
| Ebecryl 3720 | 32.86% | 33.00% | 33.29% |
| Fatty-acid Modified Bis-A Epoxy Diacrylate; 928-51 | 17.92% | 17.99% | 21.12% |
| Claytone HY | 2.01% | 2.02% | 3.20% |

TABLE 15-continued

Formulations of primers P9 to P11

| Materials | P9 | P10 | P11 |
|---|---|---|---|
| IGM-EHA* | 4.97% | 4.99% | 0.00% |
| TMPTA | 26.89% | 27.00% | 27.24% |
| TPGDA | 15.35% | 5.00% | 15.14% |
| Miwon Photocryl A-101* | 0.00% | 10.00% | 0.00% |
| Total | 100.00% | 100.00% | 100.00% |
| *Total Amine Containing Material | 4.97% | 14.99% | 0.00% |

The amine containing materials are IGM-EHA 2-Ethylhexyl-4-dimethylaminobenzoate Molecular weight 277.4 CAS No. 21245-02-3 and Miwon Photocryl A-101 which (personal contact with Miwon technical personnel) is described as an adduct of diethyl amine and TPGDA.

TABLE 16

Formulations of black inks B3 and B4

| Black Ink Formulas | B3 | B4 |
|---|---|---|
| ¹Suncarte Neutral Black, SCC50V* | 76.00% | 76.08% |
| EO-TMPTA | 24.00% | 20.02% |
| Miwon Photocryl A-101* | 0.00% | 3.90% |
| Total | 100.00% | 100.00% |
| *Total Amine containing material | 3.33% | 7.24% |
| Total Photoinitiator Content | 8.77% | 8.78% |

¹Sun Chemical Corp.

Both primer and the ink were applied using a Little Joe proofing press equipped with a 0.4 mil (10.2 μm) wedge plate. The second layer was wet-trapped over the first. Clean traps were ensured by utilizing formula manipulation and proofing methods, e.g. inking and impression settings, known to those skilled in the art. The composite (wet) construction was cured by irradiation with UV light generated by a medium pressure mercury vapor lamp at a belt speed of 100 ft./min (30.5 m/min) and a power setting of 400 W/inch (160 W/cm). The energy exposure (dosage and intensity) under this condition was measured with an EIT Powerpuck device as:

| UVA | 174 mJ/cm² | 1.186 W/cm² |
| UVB | 195 mJ/cm² | 1.206 W/cm² |
| UVC | 24 mJ/cm² | 0.141 W/cm² |

Visual print density (V) was measured with an X-Rite Model 939 spectrodensitometer. The prints were tested using the thumb-twist and finger rub tests as described above. The results are shown in Table 17.

TABLE 17

Assessment of Examples 15A to 15E.

| Ex. | Primer | Primer (EHA) | Primer (A-101) | Ink | Ink (added A-101) | Print Color Density (V) | Thumb-twist Test | Rub Test |
|---|---|---|---|---|---|---|---|---|
| 15A | P10 | 4.99% | 10.00% | B4 | 3.90% | 1.78 | PASS | PASS |
| 15B | P9 | 4.97% | none | B4 | 3.90% | 1.85 | PASS | PASS |
| 15C | P9 | 4.97% | none | B3 | none | 1.91 | PASS | PASS |
| 15D | P10 | 4.99% | 10.00% | B3 | none | 1.69 | PASS | PASS |
| 15E | P11 | none | none | B3 | none | 2.06 | PASS | PASS |

It was found that it was not necessary to add an amine in either the primer or the black ink in order to ensure good cure. It was also found that higher levels of amine made transfer to desired print densities more difficult. It should be noted that there is tertiary amine present in the photoinitiator package of the black ink. The black ink contained 2.08% Irgacure 369 (which contains one tertiary amine group in the molecule), and 1.25% ethyl EMK (which contains two tertiary amine groups in the molecule).

Example 16. Construct of: Uncoated Paper/Black Ink with Photoinitiator/Topcoat without Photoinitiator Example 16 shows effective wet trapping of a photoinitiated black ink beneath a non-photoinitiated topcoat on uncoated paper, with simultaneous curing of both layers.

Topcoats made of UV-curable materials (without photoinitiator) (T9 and T10) were printed over black ink containing photoinitiator on uncoated paper (BYK Chart PA-2831). The formulations of T9 and T10 are shown in Table 18.

TABLE 18

Formulations of topcoats T9 and T10

| Materials | T9 | T10 |
|---|---|---|
| Ebecryl 3720 | 11.57% | 11.56% |
| EO-TMPTA | 20.75% | 20.72% |
| TMPTA | 31.57% | 31.53% |
| TPGDA | 35.10% | 21.09% |
| Miwon Photocryl A101* | 0.00% | 14.10% |
| TegoRad 2300 | 0.69% | 0.69% |
| Airex 920 | 0.31% | 0.31% |
| Total | 100.00% | 100.00% |

*Amine containing material

UV-curable black ink B3 was printed per the method of Example 15 on uncoated testing paper BYK Chart PA-2831. UV-curable topcoats that did not contain photoinitiator (T9 and T10) were coated over the black ink using a #3 Mayer rod while the ink was still wet. The composite (wet) construction was cured by irradiation with UV light by the method of Example 15. Topcoats with and without amines were tested.

Visual print density (V) of the 16A constructs was 2.12, and the value of V was 1.99 for the 16B constructs. Each of Examples 16A and 16B was tested at several times post cure using the thumb-twist test and the finger-rub test. The test results are shown in Table 19.

TABLE 19

Assessment of Examples 16A and 16B

| Ex. | Topcoat | Time (Min) Post-Cure | Thumb-twist test P/F | Marring | Finger-rub test P/F | Marring |
|---|---|---|---|---|---|---|
| 16A | T9 | 1 | Pass | Slight | Fail | Smeary |
|  |  | 2 | Pass | Very Slight | Fail | Slight |
|  |  | 4 | Pass | Very Slight | Fail | Slight |
|  |  | 8 | Pass | Very Slight | Fail | Slight |
| 16B | T10 | 1 | Pass | Very Slight | Fail | Slight |
|  |  | 2 | Pass | None | Pass | None |
|  |  | 4 | Pass | None | Pass | None |
|  |  | 8 | Pass | None | Pass | None |

It was found that for commercially acceptable cure to take place, a significant level of amine is preferred in the topcoat. Without the present of amine in the topcoat, the thumb-twist test and finger-rub test can be passed. However, the surface remains very slightly smeary and visible marks can be made when rubbing a finger over the cured coating, which is not preferred commercially. There is also some post-cure hardening of the topcoat that occurs within minutes of exposure to UV radiation, so a commercially acceptable result is not obtained immediately post-cure, but rather several minutes thereafter.

Example 17. Construct of: Uncoated Paper/Primer without Photoinitiator/Black Ink with Photoinitiator/Topcoat without Photoinitiator Black photoinitiated ink was placed between layers of primer and topcoat that did not contain photoinitiator.

Proofs were made on uncoated testing paper BYK Chart PA-2831. The first down layer was uninitiated UV-curable primer P11, using the Little Joe proofing press as described in Example 15. The second down layer, photoinitiated black ink B3, was wet-trapped over the primer, using a Little Joe proofing press as described in Example 15. The third down layer, uninitiated UV-curable topcoat T10, was wet-trapped over the previous two layers using a Mayer rod per the method of Example 16. All layers were cured simultaneously by exposure to UV light at the conditions described in Example 15.

Proofs were made at visual print density as low as 1.86 and as high as 2.18, as measured with an X-Rite model 939 spectrodensitometer, with the following results:
- Thumb-twist test was passed in 1 to 2 minutes post-curing.
- Finger rub smear test was passed in 1 to 2 minutes post-curing.
- 3M 810 tape adhesive tape adhesion test was passed at 10 minutes post-curing with between 0% and 30% bond failure on the unprinted portion of the PA-2831 test card. Failure mode was between the ink and the primer.
- Solvent rub resistance (at V=1.88) was observed at 60 minutes post-cure to be 95 double-rubs using a cotton ball dampened with MEK, over the black printed portion of the PA-2831 test card.

Example 17 shows effective wet trapping of a black photoinitiated ink sandwiched between a non-photoinitiated primer and a non-photoinitiated topcoat on uncoated paper, with simultaneous curing of all layers.

Example 18. Construct of: Coated Paper/Non-Photoinitiated Yellow Ink/Hybrid Topcoat with Photoinitiator Example 18 shows effective wet trapping of a water-based hybrid topcoat containing photoinitiator printed over top of a yellow non-photoinitiated UV ink (Example 18B). Example 18 also shows that the hybrid topcoat can be cured as a single layer (Example 18A).

Yellow non-photoinitiated UV ink Y4 was made by combining Y3 with 9.7% Photocryl A101 amino acrylate from Miwon.

The hybrid topcoat T11 is a blend of a water-based coating, Dicoat AE-1349 (Sun Chemical), with energy curable materials and photoinitiators. Energy curable materials include Laromer PO 94F polyether acrylate from BASF, Photocryl A101 amino acrylate from Miwon, and Irgacure 754 and TPO-L photoinitiators from IGM Resins. The finished water-based hybrid topcoat T11 was 48.5% solids. The formula of T11 is shown in Table 20.

TABLE 20

Formulation of topcoat T11

| Materials | % |
|---|---|
| Dicoat AE-1349 (Water-base Coating) | 51.8 |
| Deionized Water | 18.7 |
| Laromer PO 94F | 18.1 |
| Photocryl A101 | 7.5 |
| Irgacure 754 | 2.0 |
| TPO-L | 1.9 |
| Total | 100.0 |

Ex. 18A

T11 was applied to BYK Chart 2810 coated paper with a #4 Mayer rod, dried at 90° C. for 60 seconds, and cured with a mercury vapor UV lamp with a lamp input power of 400 W/in (157.48 W/cm), at a line speed of 100 ft/min (30.48 m/min). The finished print construct resisted 775 doubles rubs with a MEK-wetted cotton ball. Example 18A shows that hybrid topcoat T11 is capable of being printed and cured on its own.

Ex. 18B

Y4 was printed on coated paper BYK Chart 2810 using a Little Joe proofing press with a 0.4 mil (10 µm) wedge plate. T11 was wet trapped over the top using a 2-roll hand proofer with a 165 line/inch 14 bcm anilox roller. The proof was dried for 60 seconds at 90° C. The proof was then exposed to light from a mercury vapor UV lamp with a lamp input power of 400 W/in (157.48 W/cm), at a line speed of 100 ft/min (30.48 m/min).

The cured construct passed the thumb-twist test. It also passed a finger rub and smear test. The print density as measured by an X-Rite 939 spectrodensitometer was Y=1.24 to 1.29, and the proof passed 100 double rubs with MEK. It should be noted that at this point, most of the yellow color had been extracted by the MEK from the proof surface, but there was still no sign of the topcoat actually breaking through (i.e. MEK leached the yellow pigment through the topcoat, but the mechanical structure of the topcoat remained intact). Note that in a situation where one layer is uncured, MEK typically "breaks through" the cured topcoat to the substrate in 1 to 3 rubs, therefore it can be shown that good cure was achieved.

Example 19. Construct of: Coated Paper/Photoinitiated Black Ink/Hybrid Topcoat without Photoinitiator Example 19 shows effective wet trapping of a hybrid water-based topcoat without photoinitiator, printed over top of a black photoinitiated UV ink.

Hybrid topcoat T12 containing UV curable acrylates, but no photoinitiator, was prepared. The formulation of T12 is shown in Table 21.

TABLE 21

Formulation of topcoat T12

| Materials | % |
|---|---|
| Dicoat AE-1349 (Water-base Coating) | 52.1 |
| Deionized Water | 18.8 |
| Laromer PO 94F | 21.1 |
| Photocryl A101 | 8.0 |
| Total | 100.0 |

Photoinitiated black ink B3 was printed on coated paper BYK Chart 2810 using a Little Joe proofing press with a 0.4 mil (10 μm) wedge plate. Topcoat T12 was wet trapped over B3 using a 2-roll hand proofer with a 165 lines/inch and 14 bcm anilox. The proof was dried for 60 seconds at 85° C. The proof was then exposed to UV light from a mercury vapor lamp with a lamp input power of 400 W/inch (157.48 W/cm), at a line speed of 100 ft/min (30.48 m/min).

Tests of the proof showed that the thumb-twist test was passed, finger rub resistance was excellent, and adhesion as measured by 3M 810 adhesive tape was also excellent. MEK rub resistance was 117 double rubs before the ink was removed from the substrate. Good cure was achieved.

Example 20. Construct of: Coated Paper Substrate/Oil-Based Hybrid Ink without Photoinitiator/UV Topcoat with Photoinitiator Example 20 shows effective wet trapping of an oil-based hybrid ink containing UV curable material, but without photoinitiator, printed underneath a photoinitiated UV topcoat (Sun Chemical RC88-1170 ("T13")).

A typical phenomenon observed when UV coating is wet trapped over conventional oil-based inks that dry by oxidation is call "gloss-back." The initial gloss of the coated ink decreases as the ink underneath the cured UV coating cures over the next 24 to 72 hours. This problem is well known in the industry. Since the mid-2000's a number of ink suppliers have supplied so-called "Hybrid Systems" to deal with this issue (see D. Savastano, Ink World Magazine, Sep. 6, 2005).

Hybrid cyan ink C3 was prepared by blending Sun Chemical DIA25 Diamond Process Cyan conventional sheetfed ink in a 1:1 ratio with energy curable material (a polyester acrylate energy curable resin and TMPTA). The formulation of C3 is shown in Table 22.

TABLE 22

Formulation of hybrid cyan ink C3

| Materials | % |
|---|---|
| Diamond DIA25 Process Cyan (Sheetfed Ink) | 50.0 |
| Ebecryl 870 (Allnex, polyester acrylate) | 40.2 |
| TMPTA | 9.8 |
| Total | 100.0 |

Comparative conventional cyan ink C4 was prepared by blending Sun Chemical DIA25 with a conventional low-tack extender in a 1:1 ratio. The formulation of C4 is shown in Table 23.

TABLE 23

Formulation of comparative conventional cyan ink C4

| Materials | % |
|---|---|
| Diamond DIA25 Process Cyan (Sheetfed Ink) | 50.0 |
| Lo-Tac Extender, KB-1069, Kustom Blending | 50.0 |
| Total | 100.0 |

Ex. 20A

Hybrid cyan ink C3 was printed on coated paper BYK Chart 2810 using a Little Joe proofing press with a 0.4 mil (10 μm) wedge plate to apply the first down (blue) ink. T13 was then wet trapped over the ink using a 2-roll hand proofer with a 360 lines/inch and 4.23 bcm anilox. The proof was then exposed to UV light from a mercury vapor lamp with 160 W/cm (400 W/inch) lamp input power, at a line speed of 50 m/min (164 ft/min).

Ex. 20B

Comparative conventional cyan ink C4 was printed on coated paper BYK Chart 2810 using a Little Joe proofing press with a 0.4 mil (10 μm) wedge plate to apply the first down (blue) ink. T13 was then wet trapped over the ink using a 2-roll hand proofer with a 360 lines/inch and 4.23 bcm anilox. The proof was then exposed to UV light from a mercury vapor lamp with 160 W/cm (400 W/inch) lamp input power, at a line speed of 50 m/min (164 ft/min).

The initial gloss of the proofs was measured 15 minutes after curing had occurred. The range in color strength (cyan density) for the 4 samples of Ex. 20B (using conventional cyan ink C4) was 1.07 to 1.42. The range in color strength for the 4 samples of Ex. 20A (using hybrid cyan ink C3) was 1.17 to 1.29. After 72 hours of post-curing, gloss was measured again. The test results are shown as an average for the 4 samples for each of Ex. 20A and Ex. 20B, in Table 24.

TABLE 24

Assessment of Ex. 20A and 20B

| | Ex. 20B Conventional Ink | Ex. 20A Hybrid Ink |
|---|---|---|
| Thumb-twist Resistance | 100% Pass | 100% Pass |
| Finger Rub/Smear Resistance | 100% Pass | 100% Pass |
| Initial Gloss (avg. of 4 samples) | 80.0 | 89.0 |
| 72 hour Gloss (avg. of 4 samples) | 61.8 | 85.9 |
| Gloss Change | −18.2 | −3.1 |

The results of Example 20 show that a hybrid ink made with drying oils and energy curable material, but without photoinitiator, had reduced gloss-back in comparison to conventional ink made of drying oils and oil-based varnishes when both were wet trapped with a commercial UV coating (T13) and UV cured. This demonstrates that the curing of the hybrid ink took place due to the presence of the photoinitiated UV topcoat in contact with it.

Several facts prove that good cure in the Ex. 20A hybrid ink layer occurred. Had cure not occurred, Ex. 20A would not have passed the thumb-twist or finger rub/smear test. The fact that gloss-back was 15 points greater for Ex. 20B (conventional oil-based ink) shows that less change occurred in the hybrid ink without photoinitiator than in the conventional ink. The improved cure performance would have been impossible if Ex. 20A did not have good cure performance.

Examples 21 and 22. Construct of: Paper Substrate/Cured Primer/Ink #1 without Photoinitiator/Ink #2 without Photoinitiator/Topcoat with Photoinitiator On a ManRoland 700 UV sheetfed press, a UV curable coating (Sun Chemical UV-lithographic varnish 10HC171, containing photoinitiator, was applied as a primer ("P12") inline on a paper substrate and UV cured with an interstation dryer. Then, lithographic electron beam inks from Sun chemical (C2 and M2), containing no photoinitiator, were printed on top of the cured coating. Then, the UV curable lithographic varnish 10HC1171 was applied as a topcoat ("T14"), on top of the uncured inks. Finally, ink layers and topcoat were UV cured all together through the top coat.

The press trial was done twice with two different print stocks (porous substrates). Ex. 21 used Multiart gloss paper, and Ex. 22 used Luxo Satin paper (both from *Papyrus*). The fountain solution contained 3% Sunfount 480 (Sun Chemical), and 4% isopropyl alcohol. The printing plates were Elite Pro (Agfa). The line speed was 13,000 sheets per hour, and the print lengths were 5000 sheets.

The print order was as follows:
Print station: P12 (coating weight about 2 g/m2).
Interstation dryer UV mercury built, with 160 W/cm input power.
Print station: C2 (optical density=1.4).
Print station: M2 (optical density=1.4).
Print station: T14 (coating weight about 2 g/m2).
End-dryer low energy, doped UV mercury bulb, with 160 W/cm input power.

The cure of the prints was assessed by the thumb-twist test. A thumb was pressed with force on top of the printed and dried surface of the print and turned by 90 degrees. If the ink layers underneath the topcoat are not cured and movable, the print image gets destroyed after the thumb-twist test (failed). If the image remains unchanged, it is passed.

Additionally, the paper prints were ripped apart and examined for any uncured smeary ink. If no ink stains are on the fingers, the ink layers were cured (passed). The results of the UV curing evaluation are given in Table 25.

TABLE 25

Assessment of Ex. 21 and 22

| Substrate | Ex. 21 Multiart gloss paper | Ex. 22 Luxo Satin paper |
|---|---|---|
| Thumb twist test | passed | passed |
| Ripping test | passed | passed |

Examples 21 and 22 show that the radiation curable inks were successfully UV cured between a cured UV primer and a UV topcoat, even though the radiation curable inks contained no photoinitiators. The radicals necessary for curing of the acrylate groups are supplied by migration from the topcoat during their lifetime while the composition is still liquid.

Example 23. Lamination Using the Wet Trapping Method

Two energy curable flexographic formula coatings were prepared. Flexo Formula A contains photoinitiator, and Flexo Formula B does not contain photoinitiators. The formulations of Flexo Formula A and Flexo Formula B are shown in Tables 26 and 27, respectively.

TABLE 26

Formulation of Flexo Formula A

| Component | Amount (%) |
|---|---|
| Genomer 4622 urethane acrylate (Rahn AG) | 7.47 |
| Ebecryl 40 tetrafunctional polyether acrylate (Allnex Holding Sarl) | 85.22 |
| TEGO Airex defoamer (Evonik GmbH) | 0.48 |
| BYK 361N polyacrylate (Altana) | 0.46 |
| TPO-L photoinitiator (IGM Resins) | 6.37 |
| Total | 100 |

TABLE 27

Formulation of Flexo Formula B

| Component | Amount (%) |
|---|---|
| Genomer 4622 urethane acrylate (Rahn AG) | 8.01 |
| Photomer 4361 ethoxylated diacrylate | 90.96 |
| TEGO Airex defoamer (Evonik GmbH) | 0.51 |
| BYK 361N polyacrylate (Altana) | 0.52 |
| Total | 99.99 |

It is known to those skilled in the art that energy curable Flexo Formula A should exhibit poor surface curing because it includes only a phosphine oxide photoinitiator, which is inhibited by oxygen (see, for e.g., Husar, et al. "Novel Phosphine Oxide Photoinitiators", *RadTech International Proceeding*, 2014). A way to establish a baseline and to quantify the degree of surface cure is to coat Flexo Formula A on coated paper, UV cure it, and use a 5 minute stain test with 1% potassium permanganate in deionized water on the cured surface. The depth of color of the resulting stain is proportional to the number of unreacted double bonds available for the permanganate ion to react with. It is assumed at optical density values less than or equal to 1.000 that optical density is linearly proportional to the thickness of a colored ink. A useful approximation is to assume that the degree of stain developed is linearly proportional to the thickness of uncured coating at the surface. In all of the following inventive examples, each color density value reported is the average from 3 separate proofs, 3 readings per proof, for n=9.

In the fundamental case (Ex. 23A) Flexo Formula A was coated on BYK Chart 2810 coated paper using a 2-roll Harper hand proofer with a 440 lines/inch by 3.35 bcm anilox roller. The proof was exposed to a mercury vapor UV lamp at 50% power (80 W/cm) and a belt speed of 36.6 m/min. The average UV performance was measured with an EIT Power-Puck radiometer at a dose of 67 mJ/cm$^2$, and an intensity of 0.72 W/cm$^2$ for the UVA band of light.

The baseline case, Ex. 23B, determined the expected performance of a photoinitiator containing/non-photoinitiator double layer cured in air. Such a double layer is similar to what would be found inside a laminate. Flexo Formula A was proofed as in the fundamental case, Ex. 23A, on coated paper, and then Flexo Formula B was wet-trapped over it using the same tooling. Curing was performed under the same conditions as in the fundamental case, Ex. 23A.

PETG film identified as "2 oz. Klockner" was determined to be relatively transparent to UVA light, and opaque to UVB and UVC light. TPO-L photoinitiator is known to be sensitive to UVA light. In inventive Ex. 23C, coatings were wet-trapped on paper as described in Ex. 23B, then PETG film was laminated to the wet coating(s) surface. UV exposure occurred through the PETG film per the conditions of Ex. 23A.

In inventive Ex. 23D, paper was coated as in Ex. 23A. Flexo Formula B was then applied to the PETG film using a 2-roll Harper hand proofer with a 440 lines per inch by 3.35 bcm anilox roller. The PETG and paper were laminated wet face to wet face using a roller to guide and smooth the lamination. UV curing was done through the PETG film as in Ex. 23A.

The constructs of Ex. 23A to 23D are shown in Table 28. A summary of the test results is shown in Table 29.

TABLE 28

Constructs of Ex. 23A to 23D

| Ex. | Substrate-1 | Coating A (PI) | Coating B (no PI) | Substrate-2 | Coating B (no PI) | Laminated |
|---|---|---|---|---|---|---|
| 23A | Coated paper | Applied sub-1 | — | — | — | No |
| 23B | Coated paper | Applied sub-1 | Applied sub-1 | — | — | No |
| 23C | Coated paper | Applied sub-1 | Applied sub-1 | PETG film | — | Yes |
| 23D | Coated paper | Applied sub-1 | — | PETG film | Applied sub-2 | Yes |

TABLE 29

Assessment of Ex. 23A to 23D

| Ex. | Density-Y Avg. | Density-Y Std. Dev. | Thumbtwist resistance | Smearing resistance | Density-Y vs. baseline case (23B) (%) | Performance factor vs. baseline case (23B) |
|---|---|---|---|---|---|---|
| 23A | 0.946 | 0.111 | Excellent | Poor | 117.4 | 0.9 |
| 23B | 0.806 | 0.019 | Excellent | Poor | 100.0 | 1.0 |
| 23C | 0.116 | 0.052 | Excellent | Excellent | 14.3 | 7.0 |
| 23D | 0.067 | 0.008 | Excellent | Excellent | 8.4 | 12.0 |

The first, and quite unexpected, result is that the surface cure of inventive Ex. 23B (baseline) appears to exceed that of Ex. 23A (fundamental). Flexo Formula A contains tetrafunctional polyether acrylate (Ebecryl 40). Flexo Formula B contains a less highly functionalized ethoxylated diacrylate (Photomer 4361, $(EO)_2$—HDDA). The urethane acrylate is highly functionalized, but the content only differs between the two by 0.5%. In any case, data shows that Formula B is cured to a similar degree in the B/A double layer as A is cured in the single layer. The cure of the B layer was thus used subsequently to evaluate cure in the laminates because it was the layer exposed to the stain test.

In inventive Ex. 23C and 23D, the first consideration was whether the different coatings cure to fuse into a continuous layer. They do, and if the PETG film is pulled back over itself when removed from the paper (180 degree peel test) the bond is sufficient to tear off the upper layer of the paper along with the coatings. The coatings cannot be separated from each other.

To make a surface available for the stain test, the cured laminate must be carefully separated by pulling the PETG away from the paper slowly at a 90 degree angle. This causes clean separation of Flexo coating B from the PETG. The tests then reveal a 7× to 12× improvement in cure occurring inside the laminate vs. Ex. 23B.

It should be noted that there was also a visual difference between Ex. 23C and Ex. 23D. 23C showed a "speckled" pattern of staining whereas the coloration of Ex 23D was uniform. This can be attributed to the difficulty of making the lamination. Laminating wet face to wet face results in a smoother lamination than laminating dry film to wet coating. The visual difference in smoothness is correlated to the smoother appearance of the stains in Ex. 23D.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A wet-trapping method of preparing a printed article, comprising:
    a) providing a substrate;
    b) applying to the substrate one or more energy-curable ink or coating layers (A) containing one or more photoinitiators;
    c) applying to the substrate one or more energy-curable ink or coating layers (B) containing no photoinitiators; and
    d) energy-curing all coating and/or ink layers simultaneously at the end of the print run;
    wherein one or more of the energy-curable ink or coating layers may be a primer coating; and
    wherein one or more of the energy-curable ink or coating layers may be a topcoat;
    provided that at least one of the ink or coating layers contains one or more photoinitiators;
    wherein the energy-curable ink or coating layers each contain equal to or greater than 40% by weight energy curing materials; and
    wherein step d) results in cure of all layers.

2. The method of claim 1, wherein at least one UV-curable ink or coating layer comprises one or more of an acrylate, a grafted polystyrene, a vinyl compound, a cyclic lactam, or an acrylamide; optionally wherein the acrylate is an oligomeric acrylate.

3. The method of claim 1, wherein one or more of the ink or coating layers is a hybrid ink or coating, comprising energy curing materials and non-energy curing materials; optionally wherein at least one hybrid ink or coating layer comprises greater than or equal to 40 wt % energy curing materials.

4. The method of claim 1, wherein the hybrid ink or coating layers are dried prior to wet trapping; and optionally wherein the method further comprises the use of heat up to a maximum of 100° C. after all of the ink or coating layers are applied.

5. The method of claim 1, wherein one or more ink or coating layers further comprises an amine synergist; optionally wherein at least one of the amine synergists is a tertiary amine synergist; and optionally wherein the tertiary amine is selected from the group consisting of UV curable materials and non-UV curable materials, and combinations thereof.

6. The method of claim 5, wherein the tertiary amine is 2-ethylhexyl-4-dimethylamino benzoate or wherein the tertiary amine is an adduct of diethyl amine and tripropyleneglycol diacrylate.

7. The method of claim 1, wherein the photoinitiators are selected from the group consisting of type I photoinitiators, type II photoinitiators, polymeric photoinitiators, cationic photoinitiators, and combinations thereof.

8. The method of claim 1, wherein the one or more photoinitiators are selected from the group consisting of ethyl Michlers ketone; methyl benzoyl formate; 2-oxophenyl acetate; phosphine oxide, phenyl bis(2,4,6-trimethylbenzoyl), an acyl phosphine oxide; 2-benzyl-2-(dimethylamino)-1-[4-(4-morpholinyl)phenyl]-1-butanone; 2-(4-methylbenzyl)-2-(dimethylamino)-1-(4-morpholinophenyl) butan-1-one; isopropyl thioxanthone, 2,4-diethylthioxanthone; 2-chlorothioxanthen-9-one; 1-chloro-4-propoxythioxanthone; diphenyl(2,4,6-trimethylbenzoyl)-phosphine oxide; ethyl(2,4,6-trimethylbenzoyl) phenyl phosphinate; and polymeric derivatives thereof.

9. The method of claim 1, wherein one or more of the ink or coating layers further comprise one or more materials selected from the group consisting of a non-reactive resin, pigments, release additives, flow additives, and defoamers.

10. The method of claim 9, wherein the non-reactive resin is selected from the group consisting of modified polystyrene, modified polyester, ketone resins, and combinations thereof.

11. The method of claim 1, wherein only the first down ink or coating layer contains photoinitiator, and all subsequent layers do not contain photoinitiator; or wherein only the last down ink or coating layer contains photoinitiator, and all underneath layers do not contain photoinitiator; or wherein three or more ink or coating layers are applied, and the first down ink or coating layer, and the last down ink or coating layer, contain photoinitiators, and all intermediate layers do not contain photoinitiators.

12. The method of claim 1, wherein the sequence of layers is substrate, one or more layers of primer coating, one or more layers of ink, and one or more layers of topcoat; or wherein the sequence of layers is substrate, one or more layers of ink, and one or more layers of topcoat; or wherein the sequence of layers is substrate, one or more layers of primer coating, and one or more layers of ink; or wherein the sequence of layers is substrate, and two or more layers of ink.

13. The method of claim 1, further comprising one or more ink or coating layers that are free of energy curing materials; optionally wherein the ink or coating layers that are free of energy curing materials are dried prior to using the wet trapping method of claim 1.

14. The method of claim 1, wherein the substrate is selected from the group consisting of paper, coated paper, paperboard, metal foil, polymeric film, and combinations thereof.

15. A wet-trapping method of preparing a printed article, comprising:
 a) providing a substrate;
 b) applying to the substrate one or more energy-curable ink or coating layers (A) containing one or more photoinitiators;
 c) applying to the substrate one or more energy-curable ink or coating layers (B') containing 0 wt % to 6 wt % photoinitiators; and
 d) energy-curing all coating and/or ink layers simultaneously at the end of the print run;
 wherein one or more of the energy-curable ink or coating layers may be a primer coating; and
 wherein one or more of the energy-curable ink or coating layers may be a topcoat;
 provided that at least one of the ink or coating layers (B') contains photoinitiators;
 wherein the energy-curable ink or coating layers each contain equal to or greater than 60% by weight energy curing materials; and
 wherein step d) results in cure of all layers.

16. The method of claim 15, wherein the one or more energy-curable ink or coating layers (B') contain 0 wt % to 4 wt % photoinitiators.

17. The method of claim 1, wherein only the first down ink or coating layer contains photoinitiator, and all subsequent layers do not contain photoinitiator; or wherein three or more ink or coating layers are applied, and the first down ink or coating layer, and the last down ink or coating layer, contain photoinitiators, and all intermediate layers do not contain photoinitiators.

18. A method of preparing a printed article, consistently essentially of:
 a) providing a substrate;
 b) applying to the substrate one or more energy-curable ink or coating layers (A) containing one or more photoinitiators;
 c) applying to the substrate one or more energy-curable ink or coating layers (B) containing no photoinitiators; and
 d) energy-curing all coating and/or ink layers simultaneously at the end of the print run;
 wherein one or more of the energy-curable ink or coating layers may be a primer coating; and
 wherein one or more of the energy-curable ink or coating layers may be a topcoat;
 provided that at least one of the ink or coating layers contains one or more photoinitiators;
 wherein the energy-curable ink or coating layers each contain equal to or greater than 40% by weight energy curing materials; and
 wherein step d) results in cure of all layers.

19. A method of preparing a printed article, comprising:
 a) providing a substrate;
 b) applying to the substrate one or more energy-curable ink or coating layers (A) containing one or more photoinitiators;
 c) applying to the substrate one or more energy-curable ink or coating layers (B) containing no photoinitiators; and
 d) energy-curing all coating and/or ink layers simultaneously at the end of the print run;
 wherein one or more of the energy-curable ink or coating layers may be a primer coating; and
 wherein one or more of the energy-curable ink or coating layers may be a topcoat;
 provided that at least one of the ink or coating layers contains one or more photoinitiators;
 wherein the energy-curable ink or coating layers each contain equal to or greater than 40% by weight energy curing materials;
 wherein at least one of the energy-curable ink or coating layers contains an amine synergist; and
 wherein step d) results in cure of all layers.

* * * * *